United States Patent
Sakata et al.

(10) Patent No.: US 8,447,761 B2
(45) Date of Patent: May 21, 2013

(54) LIFESTYLE COLLECTING APPARATUS, USER INTERFACE DEVICE, AND LIFESTYLE COLLECTING METHOD

(75) Inventors: Kotaro Sakata, Hyogo (JP); Kazuya Nomura, Osaka (JP); Tomohiro Konuma, Osaka (JP); Maki Yamada, Kanagawa (JP); Shigenori Maeda, Kyoto (JP)

(73) Assignee: Panasonic Corporation, Osaka (JP)

( * ) Notice: Subject to any disclaimer, the term of this patent is extended or adjusted under 35 U.S.C. 154(b) by 97 days.

(21) Appl. No.: 12/957,675

(22) Filed: Dec. 1, 2010

(65) Prior Publication Data

US 2011/0208790 A1 Aug. 25, 2011

(30) Foreign Application Priority Data

Dec. 3, 2009 (JP) .................................. 2009-275111

(51) Int. Cl.
*G06F 7/10* (2006.01)
*G06F 17/30* (2006.01)

(52) U.S. Cl.
USPC ........................................ 707/732; 707/749

(58) Field of Classification Search
USPC .................. 707/999.102, 999.107, 732, 749, 707/752, 812; 706/52
See application file for complete search history.

(56) References Cited

U.S. PATENT DOCUMENTS

| 8,108,406 B2 * | 1/2012 | Kenedy et al. ............... 707/749 |
| 2010/0217743 A1 | 8/2010 | Ueki | |

FOREIGN PATENT DOCUMENTS

| JP | 11-328266 | 11/1999 |
| JP | 2004-295505 | 10/2004 |
| JP | 2007-41964 | 2/2007 |
| JP | 2008-191702 | 8/2008 |
| WO | 2009/041349 | 4/2009 |

* cited by examiner

*Primary Examiner* — Bruce Moser
(74) *Attorney, Agent, or Firm* — Wenderoth, Lind & Ponack, L.L.P.

(57) ABSTRACT

Provided is a lifestyle collecting apparatus that collects information for determining a lifestyle of a user, and includes: an object information detecting unit configured to detect object information representing an object around the user; a relevance degree calculating unit configured to calculate a relevance degree of the user to the object, using the object information; an appearance information extracting unit configured to extract appearance information from the object information, and add the relevance degree to the extracted appearance information, the appearance information representing an appearance of the object; and a lifestyle database which stores the appearance information to which the relevance degree has been added, as the information for determining the lifestyle of the user.

4 Claims, 17 Drawing Sheets

FIG. 3

|  | Object | 001 | 002 | 003 | 004 | ... | xxx |
|---|---|---|---|---|---|---|---|
| User 001 | | 35 | 20 | 25 | 70 | ... | 55 |
| User 002 | | 25 | 5 | 90 | 20 | ... | 85 |
| User 003 | | 40 | 30 | 15 | 10 | ... | 55 |
| ⋮ | | ⋮ | ⋮ | ⋮ | ⋮ | | ⋮ |
| User xxx | | 30 | 20 | 55 | 30 | ... | 25 |

FIG. 5

[May 15, 20XX]

| Lifestyle variables A (characteristics information) | Lifestyle variables B (appearance information) |
|---|---|
| <user 001><makeup><br>[texture] matt<br>[genre] preppie style | <object 001><br>[color] red (#ff0000)<br>[texture] plain<br>[shape] linear<br>[genre] Northern European style |
| <user 001><clothes><br>[texture] plain<br>[genre] preppie style | <object 002><br>[color] yellow (#ffd700)<br>[texture] woodgrain<br>[shape] linear<br>[genre] Japanese style |
| <user 001><manner of speaking><br>talkative<br>Osaka dialect | ... |
| <user 001><manner of walking><br>fast | <object XXX><br>[color] white (#fffafa)<br>[texture] dots<br>[shape] curved<br>[genre] Northern Europe style |
| ... | |
| <user 001><profile><br>impatient<br>social<br>fanatic | <room><br>[genre] Northern Europe style<br>[scattered degree] ordered |
| ... | ... |

| user attribute | Lifestyle variables A | | Lifestyle variables B# | |
|---|---|---|---|---|
| [gender] female [age] 20-30 | (matt) (plain) (fast) (social) | (female-office-worker style) (preppie style) (talkative) (Osaka dialect) (impatient) | (red, 35) (plain, 35) (linear, 35) (Northern European style, 35) | (yellow, 20) (woodgrain, 20) (linear, 20) (Japanese style, 20) | ...(white, 55) ...(dots, 55) ...(curved, 55) ...(Northern European style, 55) |
| ... | | | | |

FIG. 7

| | t0 | t1 | t2 | ... | tn |
|---|---|---|---|---|---|
| User 001 | | | | | |
| Object 001 | 50 | 80 | 65 | ... | 70 |
| Object 002 | 15 | 10 | 0 | ... | 20 |
| Object 003 | 30 | 40 | 35 | ... | 25 |
| ... | ... | ... | ... | ... | ... |
| Object XXX | 90 | 75 | 85 | ... | 65 |

LIFESTYLE COLLECTING APPARATUS, USER INTERFACE DEVICE, AND LIFESTYLE COLLECTING METHOD

BACKGROUND OF THE INVENTION (1) Field of the Invention

The present invention relates to a lifestyle collecting apparatus that collects information indicating a lifestyle of a user, and to a user interface device that provides the user with a function based on the lifestyle of the user that is judged from the collected information.

(2) Description of the Related Art

With the increase in size and reduction in thickness of displays, the displays are experiencing further evolution, such as a display integrated into a wall or a display fit into a wall or a living space. However, the mere physical integration of displays into walls is not sufficient. For the integration, the contents to be displayed on such displays need to be fit into the walls or living spaces.

Meanwhile, each person has a diverse value and a diverse lifestyle. In addition, people of course have different lifestyles, and the lifestyle of the same individual is being changed in daily life. However, the conventional devices, such as a conventional television, have been developed with little consideration of the diversity and the temporal changes in the lifestyle of each individual.

In contrast, the lifestyle of a person can be guessed by others on a daily basis, from the appearance, behavior, and possession of the person. For example, a salesclerk of an apparel shop guesses the lifestyle of a customer from his/her hairstyle, makeup, and clothes, and recommends the clothes that fit the guessed lifestyle, that is, the clothes that the customer seemingly likes. Even when a person visits someone who does not have a business relationship with the person, the person can feel the lifestyle of the resident from the atmosphere of the entrance and rooms.

There are two ways of manually obtaining such a lifestyle, namely, guessing it by surrounding people and reporting it by the user. However, manually determining the lifestyle is troublesome, and when the lifestyle is reported by the user, the attribute noticed not by the user but by people around the user cannot be collected.

In addition, the apparatus and method for automatically judging the lifestyle is not well known. One of the examples of the lifestyle is found in preference. Most of the apparatuses and methods for automatically estimating one's preference are based on explicit actions, such as viewing records, and movement and shopping by the user (for example, see Patent Reference 1, Japanese Unexamined Patent Application Publication No. 2008-191702).

SUMMARY OF THE INVENTION

With the conventional techniques, the preference of the user is estimated based on an explicit action of the user. However, the explicit action is insufficient to estimate the lifestyle of the user. For example, the attribute that is not noticed by the user cannot be collected from the explicit action of the user. Furthermore, it is difficult to estimate the lifestyle unless the user performs the explicit action with certain number of occurrences and frequency.

The present invention is to solve the conventional problems, and has an object of providing a lifestyle collecting apparatus capable of automatically collecting information for determining the lifestyle of the user, without being based on an explicit action of the user. Furthermore, the present invention has an object of providing a user interface device that provides a function based on the lifestyle determined from the collected information indicating the lifestyle.

In order to solve the problems, the lifestyle collecting apparatus according to an aspect of the present invention is a lifestyle collecting apparatus that collects information for determining a lifestyle of a user, and includes: an object information detecting unit configured to detect object information representing an object around the user; a relevance degree calculating unit configured to calculate a relevance degree of the user to the object, using the object information; an appearance information extracting unit configured to extract appearance information from the object information, and add the relevance degree to the extracted appearance information, the appearance information representing an appearance of the object; and a lifestyle database which stores the appearance information to which the relevance degree has been added, as the information for determining the lifestyle of the user.

With the configuration, information for determining the lifestyle can be automatically collected from appearance information on an object in a space, without reporting the information from the user or the estimation by persons around the user and without being based on an explicit action of the user. Since the relevance degree of the user to the object has been added to the collected information, the extent that the user is associated with the object, that is, the degree with which the object is associated with the life of the user can be determined, for example, with reference to the relevance degree.

Moreover, the lifestyle collecting apparatus may further include a lifestyle determining unit configured to determine lifestyle information representing the lifestyle of the user, from the appearance information stored in the lifestyle database, based on the relevance degree.

With the configuration, it is possible to determine the extent that the user is associated with the object and to automatically determine the lifestyle of the user, with reference to the relevance degree. Since the relevance degree of the user to an appearance of an object that implicitly represents the lifestyle of the user is used, the lifestyle of the user that does not appear in an explicit action of the user can be determined.

Moreover, the object information detecting unit may be configured to detect a plurality of object information respectively representing objects, the plurality of object information including the object information, and the objects including the object, the relevance degree calculating unit may be configured to calculate a relevance degree of the user to each of the objects with predetermined timing, the lifestyle database may store appearance information to which the relevance degree has been added, for each of the objects, and the lifestyle determining unit may be configured to determine the lifestyle information representing the lifestyle of the user, from the plurality of appearance information stored in the lifestyle database, based on the relevance degrees.

With the configuration, it is possible to add a relevance degree to each of objects around the user with the same predetermined timing. In other words, since the extent that the user is associated with each of the objects is determined at a certain moment, it is possible to calculate not only a relevance degree to one object, which also includes the relevance to other objects. Thus, information appropriately representing the lifestyle of the user can be collected.

Moreover, the relevance degree calculating unit may be configured to generate time series information of the relevance degrees for each of the objects by repeating the calculation of relevance degrees, and determine the relevance degrees of the user to the objects based on the time series information of the relevance degrees for each of the objects, and the appearance information extracting unit may be configured to add a corresponding one of the relevance degrees determined by the relevance degree calculating unit to the extracted appearance information.

Furthermore, since a relevance degree is determined according to changes in the relevance degree over time, how the user is associated with each object according to the passage of time can be appropriately determined, not limited to the determination at a certain moment. Thus, information appropriately representing the lifestyle of the user can be collected.

The lifestyle collecting apparatus may further include a user information detecting unit configured to detect user information representing the user, wherein the relevance degree calculating unit may be configured to calculate the relevance degree of the user to the object represented by the object information, using the user information and the object information, the user being represented by the user information.

With the configuration, since the user information is detected, for example, the relevance degree of the user to the object with the detected timing can be accurately calculated.

Moreover, the user information may be image data representing the user, the object information may be image data representing the object, and the relevance degree calculating unit may be configured to calculate the relevance degree of the user to the object so that the relevance degree increases as a distance between the user and the object is shorter.

With the configuration, for example, a person who is frequently closer to an object can increase the relevance degree to the object.

Moreover, the user information may be image data representing the user, the object information may be image data representing the object, and the relevance degree calculating unit may be configured to calculate the relevance degree of the user to the object so that the relevance degree increases as the number of occurrences that the user touches the object is larger or a period for which the user touches the object is longer.

With the configuration, for example, a person who frequently touches an object can increase the relevance degree to the object.

Moreover, the user information may be sound data representing voice uttered by the user, the object information may be sound data indicating words representing the object, and the relevance degree calculating unit may be configured to calculate the relevance degree of the user to the object so that the relevance degree increases as the number of occurrences that the user utters the words representing the object is larger.

With the configuration, for example, a person who frequently talks about each object can increase the relevance degree to the object.

Moreover, the user information detecting unit may be configured to detect a plurality of user information respectively representing users including the user, the plurality of user information including the user information, the relevance degree calculating unit may be configured to calculate a relevance degree to the object for each of the users, the appearance information extracting unit may be configured to add a corresponding one of the relevance degrees calculated for each of the users to the extracted appearance information, and the lifestyle database may manage and store the appearance information to which the corresponding one of the relevance degrees has been added, for each of the users.

With the configuration, information for determining the lifestyle can be collected for each user. Thus, when users are present, the lifestyle can be determined for each user, and an interface according to the lifestyle of the user can be provided.

Moreover, the lifestyle collecting apparatus may further include a characteristics information extracting unit configured to extract characteristics information representing characteristics of the user, from the user information, wherein the lifestyle database may further store the characteristics information.

With the configuration, since the characteristics information representing the characteristics of the user is stored, information appropriately representing the lifestyle of the user can be collected.

Moreover, the characteristics information extracting unit may be configured to extract, as the characteristics information, information representing at least one of an appearance and a behavior of the user.

With the configuration, since the appearance and the behavior of the user represent the lifestyle of the user, information appropriately representing the lifestyle of the user can be collected by extracting information representing the appearance and the behavior of the user.

Moreover, the object information detecting unit may be configured to extract the object information representing, as the object, at least one of a piece of furniture, an electrical appliance, a play equipment, and a housing-related material around the user, and the appearance information extracting unit may be configured to extract, as the appearance information, information indicating at least one of a color, a texture, a pattern, a shape, and a genre of the object.

With the configuration, since the piece of furniture, the electrical appliance, the play equipment, the housing-related material, and others represent the preference of the user, information appropriately representing the lifestyle of the user can be collected by extracting information indicating a color, a texture, a pattern, a shape, and a genre of the object.

Moreover, the user interface device according to an aspect of the present invention is a user interface device that provides a user interface according to a lifestyle of a user, and includes: an object information detecting unit configured to detect object information representing an object around the user; a relevance degree calculating unit configured to calculate a relevance degree of the user to the object, using the object information; an appearance information extracting unit configured to extract appearance information from the object information, and add the relevance degree to the extracted appearance information, the appearance information representing an appearance of the object; a lifestyle database which stores the appearance information to which the relevance degree has been added; a lifestyle determining unit configured to determine lifestyle information representing the lifestyle of the user, from the appearance information stored in the lifestyle database, based on the relevance degree; and a user interface control unit configured to control the user interface based on the lifestyle information determined by the lifestyle determining unit.

With the configuration, information for determining the lifestyle can be automatically collected from appearance information on an object in a space, without reporting the information from the user or the estimation by persons around the user and without being based on an explicit action of the user. Since the relevance degree of the user to the object has been added to the collected information, it is possible to determine how much the user is associated with the object and to automatically determine the lifestyle of the user, with reference to the relevance degree. In other words, since a relevance degree of the user to an appearance of an object that implicitly represents the lifestyle of the user is used, the lifestyle of the user that does not appear in an explicit action of the user can be determined. Thereby, the user interface that matches the lifestyle of the user can be provided.

Moreover, the lifestyle determining unit may be configured to determine information indicating a material of the object, as the appearance information representing the lifestyle of the user, and the user interface control unit may be configured to select a material of a display object to be displayed on a display unit, based on the appearance information determined by the lifestyle determining unit.

With the configuration, since the material of the display object is selected based on the material of the object, for example, a background image that matches a material of a surrounding wall and others can be selected. Thereby, for example, an ambient display fit into a wall or a living space can be implemented.

Moreover, the lifestyle determining unit may be configured to determine information indicating arrangement of the object, as the appearance information representing the lifestyle of the user, and the user interface control unit may be configured to control at least one of a layout, movement, and an effect of a display object to be displayed on a display unit, according to the arrangement of the object.

With the configuration, since the layout, the movement, the effect, and others of the display object are controlled according to the arrangement of the object, the user interface according to the surrounding environment (that is, the lifestyle of the user) can be provided.

Moreover, the lifestyle determining unit may be configured to determine information representing an atmosphere of the object, as the appearance information representing the lifestyle of the user, and the user interface control unit may be configured to control sound effect or BGM to be emitted from a sound output unit, according to the atmosphere of the object.

With the configuration, since the sound effect or BGM is controlled according to the atmosphere of the object, the user interface according to the surrounding environment (that is, the lifestyle of the user) can be provided.

Moreover, the lifestyle collecting method according to an aspect of the present invention is a lifestyle collecting method of collecting information for determining a lifestyle of a user, and includes: detecting object information representing an object around the user; calculating a relevance degree of the user to the object, using the object information; extracting appearance information from the object information, and adding the relevance degree to the extracted appearance information, the appearance information representing an appearance of the object; and storing, in a lifestyle database, the appearance information to which the relevance degree has been added, as the information for determining the lifestyle of the user.

With the configuration, information for determining the lifestyle can be automatically collected from appearance information on an object in a space, without reporting the information from the user or the estimation by persons around the user and without being based on an explicit action of the user. Since the relevance degree of the user to object has been added to the collected information, how much the user is associated with the object, that is, the degree with which the object is associated with the life of the user can be determined, for example, with reference to the relevance degree.

The present invention can be implemented not only as the lifestyle collecting apparatus or the user interface device, but also as a method using processing units included in the lifestyle collecting apparatus or the user interface device as steps. Furthermore, the present invention can be implemented as a program causing a computer to execute such steps. Moreover, the present invention can be implemented as a computer-readable recording medium in which the program is recorded, such as a Compact Disc-Read Only Memory (CD-ROM) and as information, data, or a signal indicating the program. These information, data, and signal may be distributed via a communication network, such as the Internet.

Part or all of the constituent elements included in each of the lifestyle collecting apparatus and the user interface device may be included in one system large scale integration (LSI). The system LSI is a super-multifunctional LSI manufactured by integrating the constituent elements on one chip and is, specifically, a computer system including a micro processing unit, a ROM, and a Random Access Memory (RAM).

With the configuration, information for determining the lifestyle of the user can be automatically collected, without being based on an explicit action of the user.

Further Information about Technical Background to this Application

The disclosure of Japanese Patent Application No. 2009-275111 filed on Dec. 3, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 illustrates an example of relevance degrees of users to objects according to Embodiment 1 in the present invention;

FIG. 5 is a diagram illustrating an example of lifestyle variables according to Embodiment 1 in the present invention;

FIG. 7 is a diagram illustrating an example of time series information of relevance degrees according to Embodiment 1 in the present invention;

DESCRIPTION OF THE PREFERRED EMBODIMENTS

Embodiments according to the present invention will be hereinafter described with reference to drawings.

Embodiment 1

The lifestyle judging apparatus according to Embodiment 1 in the present invention collects information for determining a lifestyle of a user, and judges the lifestyle based on the collected information. The lifestyle judging apparatus includes: an object information detecting unit configured to detect object information representing an object around the user; a relevance degree calculating unit configured to calculate a relevance degree of the user to the object, using the object information; an appearance information extracting unit configured to extract appearance information from the object information, and add the relevance degree to the extracted appearance information, the appearance information representing an appearance of the object; a lifestyle database which stores the appearance information to which the relevance degree has been added; and a lifestyle determining unit configured to determine lifestyle information representing the lifestyle of the user, from the appearance information stored in the lifestyle database, based on the relevance degree.

Figure 1:
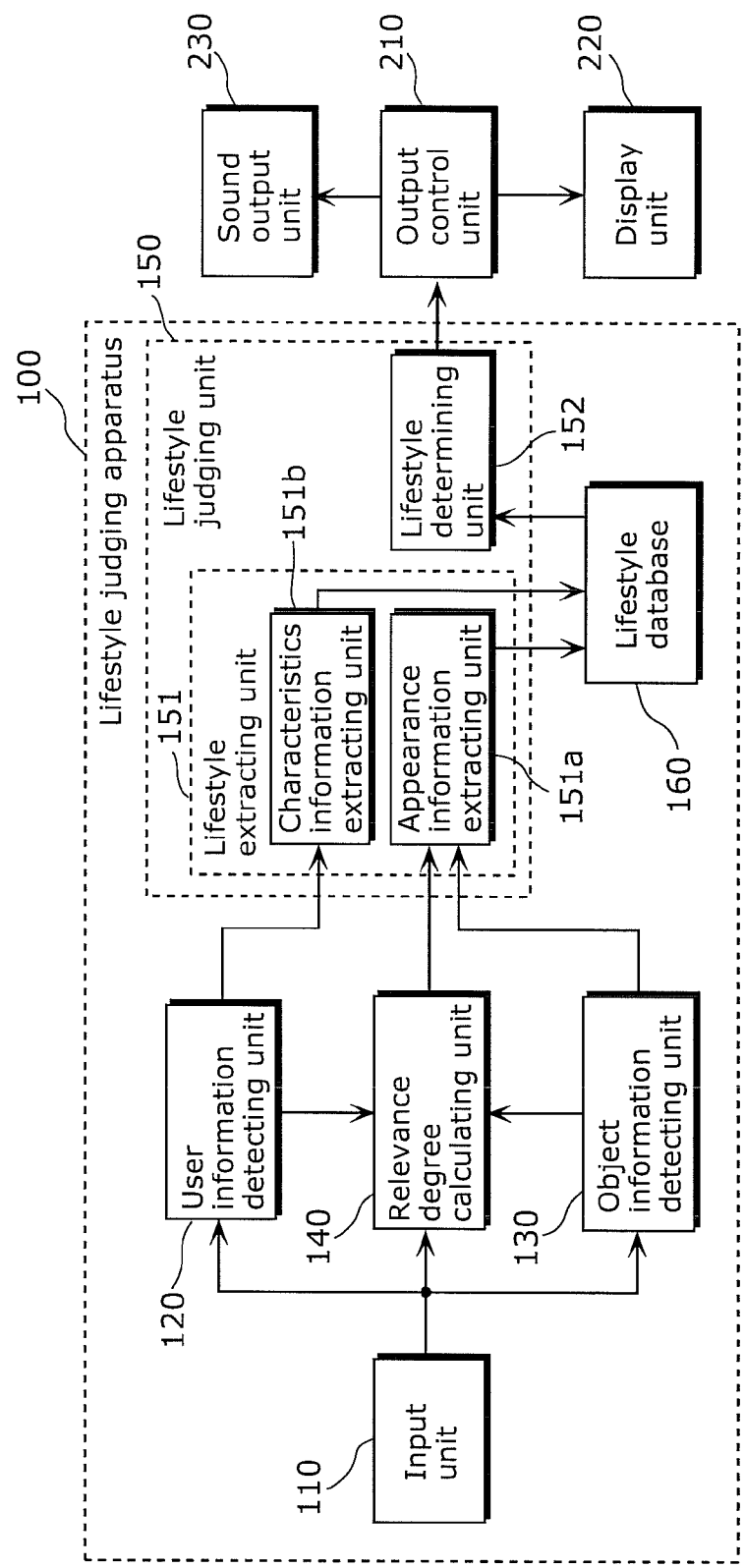
FIG. 1 is a block diagram illustrating an example of a configuration of a lifestyle judging apparatus according to Embodiment 1 in the present invention.

FIG. 1 is a block diagram illustrating a configuration of a lifestyle judging apparatus 100 according to Embodiment 1 in the present invention. The lifestyle judging apparatus according to Embodiment 1 in the present invention collects information for judging a lifestyle of a user, and judges the lifestyle of the user based on the collected information.

The lifestyle of the user is information indicating characteristic attributes appearing in the daily life of the user. The characteristic attributes appearing in the daily life include an attribute of the user and an attribute of an object around the user. The attribute of the user is information indicating at least one of the gender, age, family structure, appearance, personality, preference, hobby, occupation, action (behavior), and others of the user, for example.

Furthermore, the object around the user is for example at least one of a piece of furniture, an electrical appliance, a play equipment, a housing-related material, and others around the user. The attribute of the object is information indicating at least one of a color, a texture, a pattern, a shape, a genre, and others of the object. Here, the genre of the object is information representing an atmosphere of the object, and is, more specifically, Japanese style, Northern European style, Western style, Asian style, ethnic, and others. Furthermore, the object may be a pet animal, for example.

As illustrated in FIG. 1, the lifestyle judging apparatus 100 according to Embodiment 1 in the present invention includes an input unit 110, a user information detecting unit 120, an object information detecting unit 130, a relevance degree calculating unit 140, a lifestyle judging unit 150, and a lifestyle database 160.

The input unit 110 obtains input data indicating a situation around the user. The input unit 110 includes, for example, a capturing apparatus, and obtains image data including an image of an object around the user, as the input data. The input data may include an image of the user.

Furthermore, the input unit 110 includes a sound pickup device, and may obtain sound data including voice uttered by the user. The sound data may include sound effect and background music (BGM) emitted from an object.

Furthermore, the input unit 110 may include at least one of an optical sensor, a touch sensor, and a pressure sensor. Here, the input unit 110 obtains, as the input data, data indicating that a predetermined object is touched, the strength of the touch, and others. Furthermore, the input unit 110 may obtain an input signal from an external apparatus as the input data. For example, the input unit 110 may obtain operation information by the user from an external apparatus, such as a digital video recorder and a digital video player.

Figure 2A:
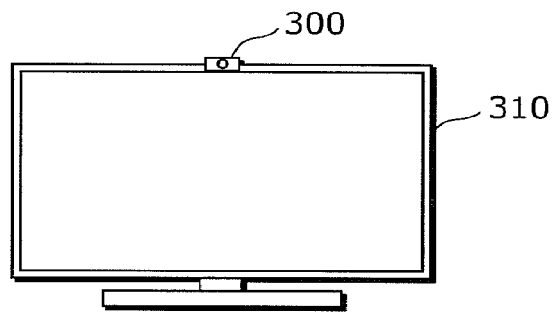
FIG. 2A schematically illustrates an example of placement of a camera that is an example of an input unit according to Embodiment 1 in the present invention.
Figure 2B:
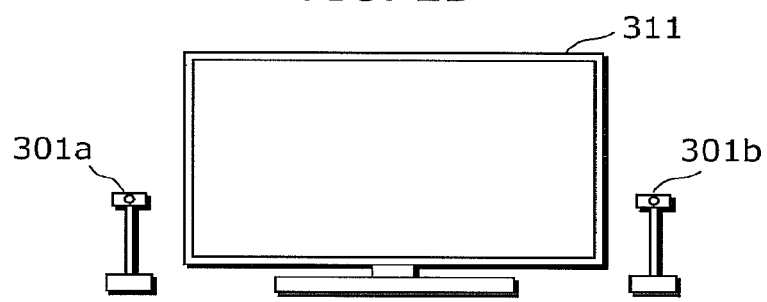
FIG. 2B schematically illustrates an example of placement of cameras that are examples of input units according to Embodiment 1 in the present invention.
Figure 2C:
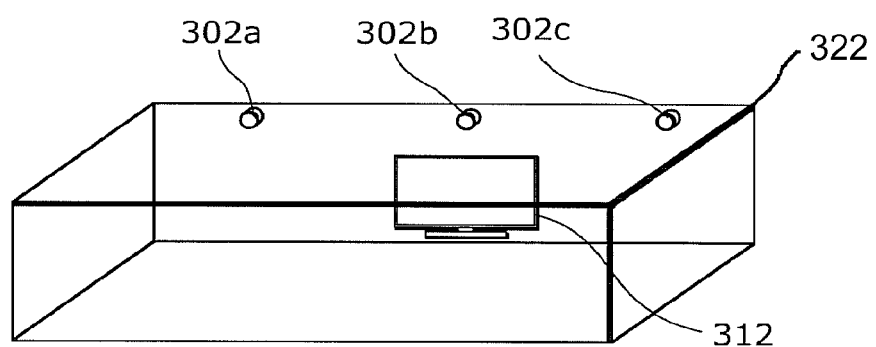
FIG. 2C schematically illustrates an example of placement of cameras that are examples of input units according to Embodiment 1 in the present invention.

FIGS. 2A to 2C schematically illustrate examples of placement of capturing apparatuses (cameras) that are examples of the input unit 110 according to Embodiment 1 in the present invention.

As illustrated in FIG. 2A, a camera 300 may be placed (included) in a video display apparatus 310. Alternatively, as illustrated in FIG. 2B, cameras 301a and 301b may be placed separately from a video display apparatus 311. Although FIG. 2B illustrates the two cameras 301a and 301b, the number of cameras may be one or more than three. Alternatively, as illustrated in FIG. 2C, cameras 302a, 302b, and 302c may be placed at respective appropriate positions within a space 322 where a video display apparatus 312 is placed.

The user information detecting unit 120 detects user information representing a user. Embodiment 1 assumes a case where users are present, and thus the user information detecting unit 120 detects a plurality of user information respectively representing the users.

The user information detecting unit 120 detects the user information by, for example, performing image processing on the image data captured by the capturing apparatus included in the input unit 110. The user information is an image representing a user, and the user information detecting unit 120 extracts the image of the user from the input image data, using image recognition and others.

Furthermore, the user information detecting unit 120 may detect the user information by performing sound processing on the sound data collected by the sound pickup device included in the input unit 110. The user information is sound data representing voice uttered by the user, and the user information detecting unit 120 extracts the voice of the user from the input sound data, using voice recognition and others.

More specifically, after extracting a face area from the image information obtained by the capturing apparatus, the user information detecting unit 120 outputs user identification information for identifying the user by matching a pre-registered face image and the face image of the extracted face area. The user information detecting unit 120 extracts, for example, an area of pixels indicating a skin color of a person from the image information, based on a skin color area of the person in a preset color space in order to extract the face area.

Then, the user information detecting unit 120 calculates inter-frame differences in the extracted skin color portion, and judges whether or not a sum of absolute values of the inter-frame differences exceeds a threshold. When the sum of absolute values of the inter-frame differences is not larger than the threshold, the user information detecting unit 120 eliminates the portion, assuming that a skin color other than that of a human, such as a wall, is extracted. When the sum of absolute values of the inter-frame differences exceeds the threshold, the user information detecting unit 120 has only to detect a skin color portion as a skin color area of a human face.

When a face area is extracted, the attribute information of the user such as the gender and age can be estimated by applying pattern recognition on the image information of the face area. For example, Patent Reference 2 (International Publication WO 2009/041349 "PHYSICAL PROPERTY VALUE ESTIMATING SYSTEM, AGE ESTIMATING SYSTEM, GENDER ESTIMATING SYSTEM, AGE/GENDER ESTIMATING SYSTEM, AND PHYSICAL PROPERTY VALUE ESTIMATING METHOD") discloses the technique for estimating an attribute, such as the gender and age, from image information.

With the presence of users, estimation of attribute information of the user enables identification of each user according to Embodiment 1. The lifestyle judging unit 150 to be described later may identify each user.

The object information detecting unit 130 detects object information representing an object around the user. Embodiment 1 assumes a case where objects are present around the user, and thus the object information detecting unit 130 detects a plurality of object information respectively representing the objects.

For example, the user information detecting unit 130 detects the object information by performing image processing on the image data captured by the capturing apparatus included in the input unit 110. The object information is image data representing one of the objects present in a space, such as a piece of furniture, an electrical appliance, a play equipment, and a housing-related material, and the object information detecting unit 130 extracts an object image from the input image data, using image recognition. For example, the object information detecting unit 130 extracts an object image by pattern matching with pre-registered object information.

Furthermore, the user information detecting unit 130 may detect the object information by performing sound processing on the sound data collected by the sound pickup device included in the input unit 110. Here, the object information is sound data indicating words representing an object, such as a piece of furniture, an electrical appliance, a play equipment, a housing-related material, and others, and the object information detecting unit 130 extracts an object sound from the input sound data, using voice recognition.

The words representing the object may be a name or an abbreviation of an object, or other words related to the object. As an example, when the object is a refrigerator, the words representing the object may be words representing a food and a beverage to be stored in the refrigerator.

The relevance degree calculating unit 140 calculates a relevance degree of the user to an object. With the presence of users and objects according to Embodiment 1, the relevance degree calculating unit 140 calculates a relevance degree of each of the users to each of the objects.

The relevance degree of the user to an object is a value indicating a relevance degree of the user to the object. The relevance degree is a value indicating a connection between the user and the object. The relevance degree is determined based on, for example, a distance between the user and the object, the frequency with which the user uses the object, and the frequency with which the user utters words related to the object.

When the relevance degree of the user to the object is higher, the relevance degree becomes a higher value. The relevance degree is indicated by, for example, values 0 to 100. Alternatively, the relevance degree may be represented step-by-step, such as "low", "middle", and "high".

More specifically, the relevance degree calculating unit 140 calculates a relevance degree of the user to an object so that the relevance degree of the user to the object increases as a distance between the user and the object is shorter. For example, the relevance degree calculating unit 140 calculates a distance between the user and the object using a user image and an object image, and calculates the relevance degree by normalizing the inverse of the calculated distance to a range between 0 and 100.

Furthermore, the relevance degree calculating unit 140 may calculate a relevance degree of the user to an object so that the relevance degree of the user to the object increases as a period for which the user touches the object is longer or as the number of occurrences that the user touches the object is larger. For example, the relevance degree calculating unit 140 calculates a touch period or the number of touches using a user image and an object image, and calculates the relevance degree by normalizing the touch period or the number of touches to a range between 0 and 100. The user image and the object image are still images or moving images.

Furthermore, the relevance degree calculating unit 140 calculates a relevance degree of the user to an object so that the relevance degree of the user to the object increases as the number of occurrences that the user utters words indicating the object increases. In other words, the relevance degree calculating unit 140 calculates a relevance degree of the user to an object so that the relevance degree increases as the frequency that words related to the object appear increases. For example, the relevance degree calculating unit 140 calculates the number of appearances of the words indicating the object using a user voice and an object sound, and calculates the relevance degree by normalizing the calculated number of appearances to a range between 0 and 100.

The lifestyle judging unit 150 extracts information for judging the lifestyle of the user from user information and object information, and adds a relevance degree to the extracted information. The information to which the relevance degree has been added is stored in the lifestyle database 160. Furthermore, the lifestyle judging unit 150 determines information representing the lifestyle of the user from the information stored in the lifestyle database 160, based on the relevance degree. As illustrated in FIG. 1, the lifestyle judging unit 150 includes a lifestyle extracting unit 151 and a lifestyle determining unit 152.

The lifestyle extracting unit 151 extracts information for judging the lifestyle of the user, from the user information and the object information. As illustrated in FIG. 1, the lifestyle extracting unit 151 includes an appearance information extracting unit 151a and a characteristics information extracting unit 151b.

The appearance information extracting unit 151a extracts appearance information representing the appearance of an object from object information. For example, the appearance information extracting unit 151a extracts information representing a color, a texture, a pattern, and a shape of each object as appearance information by performing image processing on object images. Furthermore, the appearance information extracting unit 151a may extract information representing an atmosphere of each object, such as Japanese style, Northern European style, and modern style based on the extracted information, using the pattern recognition technique, for example, a known subspace method.

The characteristics information extracting unit 151b extracts characteristics information representing the characteristics of the user from the user information. For example, the characteristics information extracting unit 151b extracts information representing at least one of the appearance and the behavior of the user by performing image processing on user images. For example, the information representing the appearance of the user includes information representing an outward aspect of the user, such as clothes, hairstyle, and makeup. The information representing the behavior of the user includes information relating to the personality of the user, such as the manner of speaking, walking, and gesture.

More specifically, the characteristics information extracting unit 151b obtains images of a face area and of the clothes as user images, and generates a tag related to each image, such as a hairstyle, a makeup, and a color and a texture of the clothes of the user by performing image processing on the user images. Furthermore, the characteristics information extracting unit 151b may detect a manner of speaking and a gesture from the user images (images of each user that are temporally different from each other) or moving images that are included in the input data obtained by the capturing apparatus included in the input unit 110. Furthermore, the characteristics information extracting unit 151b determines, from patterns of walking speed and gestures, an attribute value indicating "unfussy" for a person who walks slowly or slowly performs a gesture, and an attribute value indicating "impatient" for a person who walks fast or hastily performs a gesture, as the characteristics information of the user.

Furthermore, the characteristics information extracting unit 151b may extract a speech pattern based on a user voice included in the sound data obtained by the sound pickup device included in the input unit 110. The speech patterns include the loudness, pitch, intonation, speed, tone, and smoothness of a voice. The characteristics information extracting unit 151b determines, as the characteristics information of the user and from the speech patterns, an attribute value indicating "unfussy" for a person who speaks slowly and an attribute value indicating "impatient" for a person who speaks fast Furthermore, the characteristics information extracting unit 151b may extract the characteristics information of the user based on operation information of the user when the input unit 110 can obtain the operation information of the user from an external apparatus. For example, when the input unit 110 can receive a signal from a remote control of a video display apparatus, the characteristics information extracting unit 151b determines, as the characteristics information of the user, an attribute value indicating "unfussy" when a degree of switching channels is lower than a threshold and an attribute value indicating "impatient" when a degree of switching the channels is equal to or larger than the threshold.

Furthermore, the lifestyle determining unit 152 determines lifestyle information representing the lifestyle of the user from the appearance information stored in the lifestyle database 160, based on a relevance degree. Furthermore, the lifestyle determining unit 152 may determine the lifestyle information from the characteristics information stored in the lifestyle database 160.

For example, the lifestyle determining unit 152 determines the appearance information to which the highest relevance degree has been added, from a plurality of appearance information as the lifestyle information. Alternatively, the lifestyle determining unit 152 may generate the lifestyle information by weighting the plurality of appearance information, according to relevance degrees respectively added to the plurality of appearance information. For example, when a relevance degree 50 has been added to each of appearance information indicating red and appearance information indicating yellow, the lifestyle determining unit 152 may determine information indicating orange color as the lifestyle information.

Furthermore, the lifestyle determining unit 152 may determine the lifestyle information from the characteristics information corresponding to each of the users. For example, the lifestyle determining unit 152 determines the characteristics information corresponding to the user included in the input data obtained by the input unit 110 at present, as the lifestyle information.

The lifestyle database 160 is a memory for storing appearance information to which a relevance degree has been added. More specifically, the lifestyle database 160 stores appearance information to which a relevance degree has been added, for each object. More specifically, the lifestyle database 160 manages and stores, for each user, the appearance information managed for each object. Here, the lifestyle database 160 may store the characteristics information for each user.

As described above, the lifestyle judging apparatus 100 according to Embodiment 1 in the present invention obtains the appearance information of an object present in a living space of the user, and adds a relevance degree of the user to the object, to the appearance information. Furthermore, the lifestyle judging apparatus 100 determines the lifestyle information representing the lifestyle of the user based on the added relevance degree.

The determined lifestyle information is outputted to an output control unit 210 as illustrated in FIG. 1. The output control unit 210 controls a user interface based on the determined lifestyle information. More specifically, the output control unit 210 controls a display unit 220 and a sound output unit 230. The details of the control on a user interface will be described in Embodiment 2.

Next, a relevance degree of the user to an object according to Embodiment 1 in the present invention will be described. FIG. 3 illustrates an example of relevance degrees of users to objects according to Embodiment 1 in the present invention.

The relevance degree calculating unit 140 calculates the relevance degrees of the users to the objects. The relevance degree calculating unit 140 generates and stores a relevance degree table indicating the relevance degrees of the users to the objects as illustrated in FIG. 3. The relevance degree table may be stored in the lifestyle database 160.

In the example of FIG. 3, the relevance degree of each user to each object is indicated by one of values 0 to 100 inclusive. For example, the relevance degree of a user 001 to an object 001 is 35, while the relevance degree of the user 001 to an object 002 is 20.

Figure 4A:
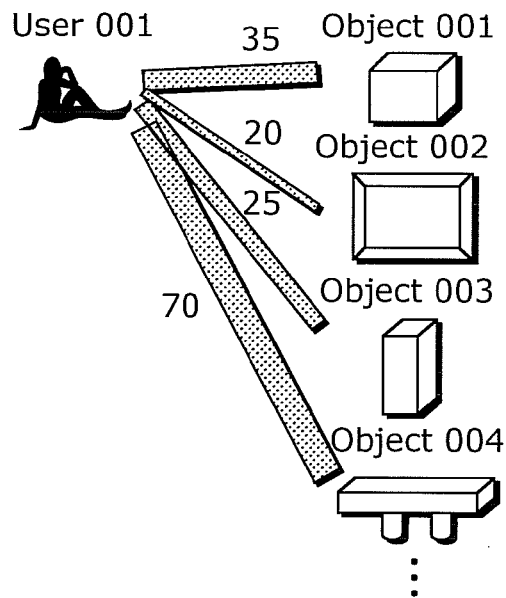
FIG. 4A illustrates an example of relevance degrees of one user to objects according to Embodiment 1 in the present invention.
Figure 4B:
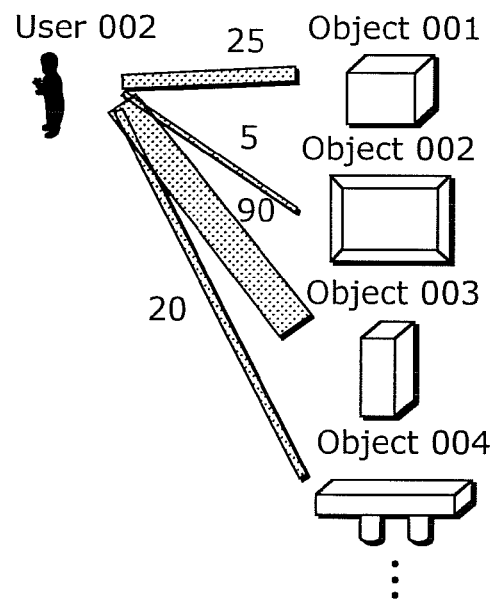
FIG. 4B illustrates an example of relevance degrees of one user to objects according to Embodiment 1 in the present invention.
Figure 4C:
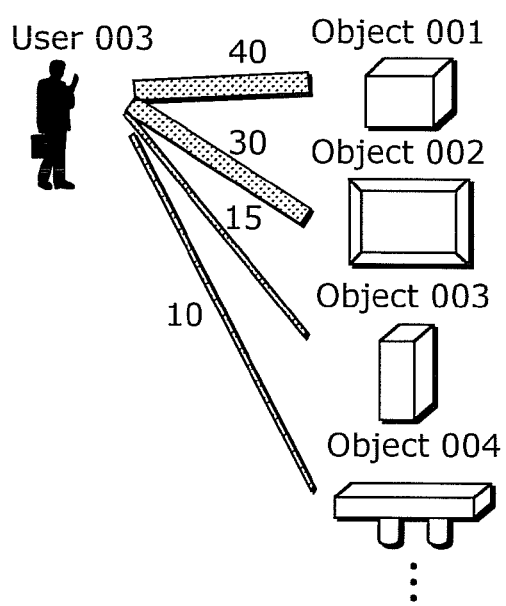
FIG. 4C illustrates an example of relevance degrees of one user to objects according to Embodiment 1 in the present invention.

FIGS. 4A to 4C illustrate examples of relevance degrees of one user to objects according to Embodiment 1 in the present invention. More specifically, FIGS. 4A to 4C schematically illustrate the relevance degrees for each object, by exemplifying three of the users 001, 002, and 003.

For example, the user 002 is a child, and thus the relevance degree to an object 003 that is a toy for children (play equipment) is as high as 90. In contrast, the relevance degrees of the users 001 and 003 to the object 003 are as relatively low as 25 and 15, respectively. This is because it is possible to determine that the user 002 is more involved in the object 003 than the users 001 and 003, that is, the relevance degree of the user 002 to the object 003 is higher than those of the users 001 and 003.

Next, information (lifestyle variables) for judging the lifestyle of the user that is extracted by the lifestyle extracting unit 151 will be described. FIG. 5 is a diagram illustrating an example of the lifestyle variables according to Embodiment 1 in the present invention.

The lifestyle variables are information for judging the lifestyle of the user, and include lifestyle variables A and lifestyle variables B as illustrated in FIG. 5.

The lifestyle variables A are characteristics information extracted by the characteristics information extracting unit 151b. More specifically, the lifestyle variables A are classified into predetermined categories as illustrated in FIG. 5. The categories of the lifestyle variables A include, for example, makeup, clothes, and the manner of speaking and walking. Furthermore, categories of the makeup and clothes may be subdivided into, for example, colors, textures, patterns, and genres.

For example, the characteristics information extracting unit 151b extracts a color and a texture of the makeup as characteristics information by performing image recognition on user information (user image) that is image data representing the user, and extracts the genre estimated from the color and the texture as the characteristics information. The genres of the makeup are examples of the characteristics information representing the impression of the makeup, and include, more specifically, "preppie style", "female-office-worker style", and "student style". The characteristics information extracting unit 151b holds a table indicating correspondences between information indicating genres of the makeup and information indicating colors and textures, and estimates a genre from the colors and the textures with reference to the table.

Furthermore, the characteristics information extracting unit 151b may extract a color, a pattern, a texture, and others of the clothes as the characteristics information by performing image recognition on the user image, and may extract a genre estimated from the color, the pattern, the texture, and others as the characteristics information. The genres of the makeup are examples of the characteristics information representing an impression of the makeup, and include, more specifically, "preppie style", "female-office-worker style", and "student style". The characteristics information extracting unit 151b holds a table indicating correspondences between information indicating genres of the clothes and information indicating colors, textures, and others, and estimates a genre from the colors and textures with reference to the table.

Furthermore, the characteristics information extracting unit 151b may extract the manner of speaking (speech pattern) as characteristics information by performing voice recognition on the user information (user voice) representing the voice uttered by the user. The manner of speaking is information representing the frequency and the speed of utterance, for example, "talkative", "quiet", and "speaking fast". Alternatively, the manner of speaking may be information relating to languages, for example, "Osaka dialect", "standard language", and "English".

Furthermore, the characteristics information extracting unit 151b may extract the manner of walking as the characteristics information by performing image recognition on the user image. The manner of walking is information representing, for example, "fast" and "slowly".

Furthermore, the characteristics information extracting unit 151b may estimate a profile of the user by combining more than one such information, and extract information representing the estimated profile as the characteristics information. The information representing the profile is information representing the personality of the user, such as "impatient", "social", and "fanatic".

For example, the characteristics information extracting unit 151b extracts information indicating that the manner of walking is "fast" by performing image recognition on the user image, and further extracts information indicating that the manner of speaking is "fast" by performing voice recognition on the user voice. Here, the characteristics information extracting unit 151b may estimate "impatient" as the profile of the user, from the information indicating that the manner of walking is "fast" and the information indicating that the manner of speaking is "fast". The characteristics information extracting unit 151b holds a table indicating correspondences between the information indicating the profile and the information that can be extracted from the user image and user voice, and estimates information indicating the profile with reference to the table.

The lifestyle variables B are appearance information extracted by the appearance information extracting unit 151a. More specifically, the lifestyle variables B are classified into predetermined categories for each object as illustrated in FIG. 5. The set categories are, for example, colors, textures, shapes, and genres.

For example, the appearance information extracting unit 151a extracts a color, a texture, and a shape of each object as appearance information by performing image recognition on object information (object image) that is image data representing the object. Furthermore, the appearance information extracting unit 151a extracts a genre estimated from the color, the texture, the shape, and others as the appearance information. Here, the genres of the object are information representing an atmosphere of the object, and include, more specifically, Japanese style, Northern European style, Western style, Asian style, ethnic, and others.

Furthermore, the appearance information extracting unit 151a may extract appearance information of a room from a plurality of appearance information respectively extracted from a plurality of object information. The appearance information of a room is, for example, a genre of the room representing an atmosphere of the room and an ordered state (scattered degree) of the room. For example, the appearance information extracting unit 151a estimates the genre of the room as "Northern European style" when the number of objects indicating "Northern European style" exceeds a predetermined threshold.

Furthermore, the appearance information extracting unit 151a may extract information representing the arrangement of an object in a space by performing image recognition on the object image. Here, the appearance information extracting unit 151a may extract an ordered state of the room as appearance information depending on whether objects are arranged in an ordered state or in a scattered state. The ordered state of the room is indicated by, for example, "ordered" or "scattered (random)."

Although FIG. 5 exemplifies data on May 15, 20XX, data may be stored, updated, and deleted on a day-to-day basis, on a month-to-month basis, or with the appropriate timing. The lifestyle variables A (characteristics information) and the lifestyle variables B (appearance information) may be updated with different timings. Data of the lifestyle variables A need to be stored more frequently than data of the lifestyle variables B. This is because the characteristics information (lifestyle variables A) representing the characteristics of the user significantly changes on a daily basis, while the appearance information (lifestyle variables B) representing the characteristics of objects around the user less significantly changes on a daily basis. More specifically for example, while the user normally changes the clothes every day, the user less frequently changes a piece of furniture, an electrical appliance, and others, such as on a month-to-month basis or on a year-to-year basis. With different frequencies of updates, the processing amount for collecting information can be reduced.

Figure 6:
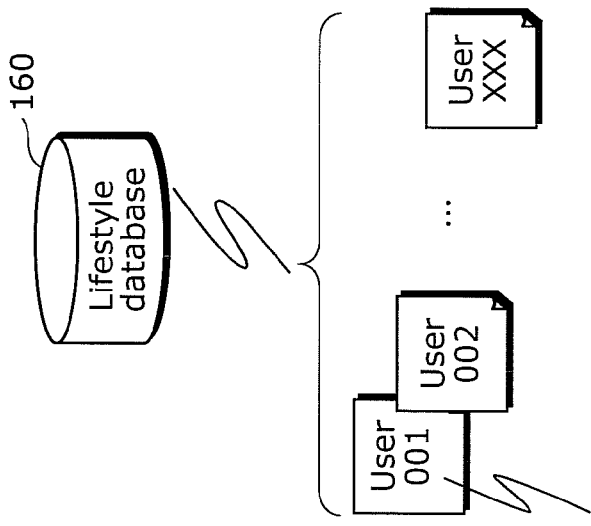
FIG. 6 is a diagram illustrating an example of information to be stored in a lifestyle database according to Embodiment 1 in the present invention.

Next, information to be stored in the lifestyle database 160 will be described. FIG. 6 is a diagram illustrating an example of information to be stored in the lifestyle database 160 according to Embodiment 1 in the present invention.

As illustrated in FIG. 6, a user attribute, such as gender and age, lifestyle variables A, and lifestyle variables B# are stored in the lifestyle database 160 for each user. The lifestyle variables B# are information obtained by adding a relevance degree of the user to each object, to the lifestyle variables B (appearance information). For example, since a relevance degree of a user 001 to an object 001 is 35 with reference to FIG. 3, the appearance information extracting unit 151a adds the relevance degree 35 of the user 001 to the object 001, to each of a color "red (#ff0000)", a texture "plain", a shape "linear", and a genre "Northern European style" of the object 001. Thereby, as illustrated in FIG. 6, values each indicating "red (#ff0000), 35", "plain, 35", "linear, 35", and "Northern European style, 35" are stored in the lifestyle database 160 as the lifestyle variables B# of the user 001. In FIG. 6, the color hex code, such as (#ff0000) is omitted.

Similarly, since a relevance degree of the user 001 to an object 002 is 20 with reference to FIG. 3, the appearance information extracting unit 151a adds the relevance degree 20 of the user 001 to the object 002, to each of a color "yellow (#ffd700)", a texture "woodgrain", a shape "linear", and a genre "Japanese style" of the object 002. Thereby, as illustrated in FIG. 6, values each indicating "yellow (#ffd700), 20", "woodgrain, 20", "linear, 20", and "Japanese style, 20" are stored in the lifestyle database 160 as the lifestyle variables B# of the user 001.

Similarly, since a relevance degree of the user 001 to an object XXX is 55 with reference to FIG. 3, the appearance information extracting unit 151a adds the relevance degree 55 of the user 001 to the object XXX, to each of a color "white (#fffafa)", a texture "dots", a shape "curved", and the genre "Northern European style" of the object XXX. Thereby, as illustrated in FIG. 6, values each indicating "white (#fffafa), 55", "dots, 55", "curved, 55", and "Northern European style, 55" are stored in the lifestyle database 160 as the lifestyle variables B# of the user 001.

Thus, values for the same attribute, such as a color, are stored in the lifestyle database 160 as the lifestyle variables B# of each user, for example, "red (#ff0000), 35" and "yellow (#fffafa), 25". When information stored in the lifestyle database 160 is used for presenting a content or for adapting the user interface to the user, the lifestyle determining unit 152 determines the lifestyle information based on the relevance degree added to each attribute.

For example, the lifestyle determining unit 152 determines the lifestyle information by selecting one of relevance degrees or weighing the relevance degrees. For example, assume that four values, "red (#ff0000), 25", "yellow (#fffafa), 5", "green (#006400), 90)", and "white (#fffafa)", 45" are stored as the lifestyle variables B# of the user 002. Here, the lifestyle determining unit 152 determines (90) "green (#006400)" indicating the highest relevance degree, as the lifestyle information. Alternatively, the lifestyle determining unit 152 may determine the color mixture of the colors as the lifestyle information, by weighing each of the relevance degrees 25, 5, 90, and 45.

Next, a method of calculating a relevance degree will be described.

In order to more exactly obtain the lifestyle of the user, it is preferable to always monitor the user and objects around the user. Thus, in the lifestyle judging apparatus 100 according to Embodiment 1 in the present invention, for example, the input unit 110 that is a capturing apparatus repeatedly and always captures images of the user and the objects around the user as moving images or as still images. Then, the relevance degree calculating unit 140 repeatedly calculates a relevance degree of each user to each object. Thereby, the relevance degree calculating unit 140 generates time series information of relevance degrees for each of the objects.

FIG. 7 is a diagram illustrating an example of the time series information of relevance degrees according to Embodiment 1 in the present invention. The relevance degree calculating unit 140 repeatedly calculates a relevance degree at predetermined time intervals, for example, for every 1 second, 10 seconds, 1 minute, and 5 minutes. Thereby, the time series information indicating relevance degrees to objects at times t0, t1, t2, . . . , and tn is generated for each user as illustrated in FIG. 7. The generated time series information of relevance degrees is stored in an internal memory and others of the relevance degree calculating unit 140.

The time intervals at which relevance degrees are calculated may be indicated by fixed values or random values. Furthermore, the relevance degree calculating unit 140 repeatedly calculates the relevance degrees for a predetermined period. Alternatively, the relevance degree calculating unit 140 repeatedly calculates the relevance degrees until a predetermined timing, such as upon receipt of an instruction from the user.

Then, the relevance degree calculating unit 140 determines a relevance degree of the user to a corresponding object, based on the time series information of the relevance degrees for each object. The determined relevance degree is a value to be stored in the lifestyle database 160. In other words, the appearance information extracting unit 151a adds the determined relevance degree to the appearance information of the corresponding object.

The appearance information extracting unit 151a determines the relevance degree at predetermined intervals, for example, every day and every 1 week. In other words, relevance degrees to be stored in the lifestyle database 160 are updated every day or every 1 week.

For example, the relevance degree calculating unit 140 calculates an average value of relevance degrees to the object 001 between the times t0 and tn, as a relevance degree to the object 001. Alternatively, the relevance degree calculating unit 140 may determine the largest value of the relevance degrees to the object 001 between the times t0 and tn, as a relevance degree to the object 001.

Figure 8:
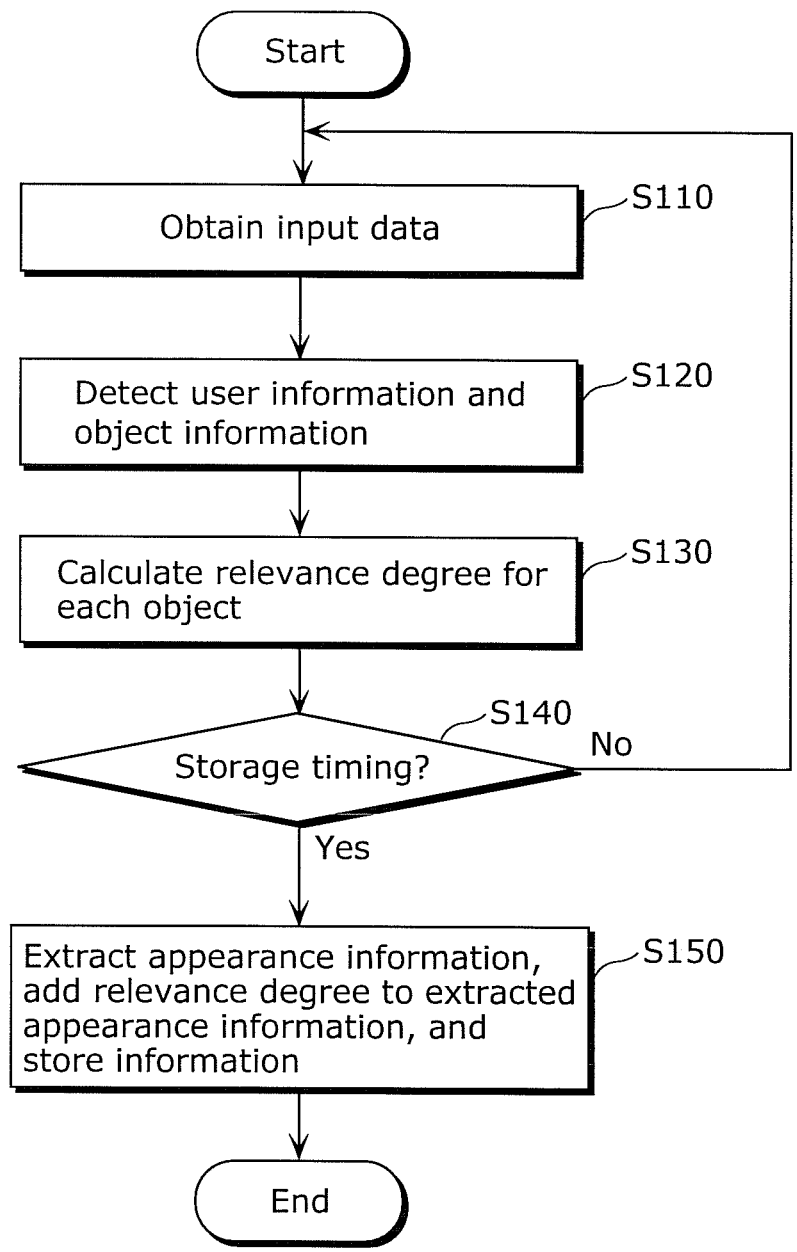
FIG. 8 is a flowchart illustrating an example of operations performed by the lifestyle judging apparatus according to Embodiment 1 in the present invention.

FIG. 8 is a flowchart illustrating an example of operations performed by the lifestyle judging apparatus 100 according to Embodiment 1 in the present invention.

First, the input unit 110 obtains input data (S110). For example, a capturing apparatus included in the input unit 110 obtains, as the input data, image data including images of the user and objects around the user by capturing images of a living space of the user. Furthermore, a sound pickup device included in the input unit 110 obtains, as the input data, sound data including a voice of the user and sound emitted from an object by collecting sound in a living space of the user.

Next, the user information detecting unit 120 and the object information detecting unit 130 respectively detect user information and object information, from the input data (S120). For example, the user information detecting unit 120 obtains a user image representing the user, as the user information by performing image recognition (for example, facial recognition) on the image data. Furthermore, the user information detecting unit 120 obtains a user voice that is a voice of the user, as the user information by performing voice recognition on the sound data. Here, when the input data includes data of users, the user information detecting unit 120 detects a plurality of user information respectively representing the users.

Furthermore, the object information detecting unit 130 obtains an object image representing an object as object information by, for example, performing image recognition on the image data. Furthermore, the object information detecting unit 130 obtains, as the object information, an object sound including sound emitted from the object and words representing the object that are included in the voice uttered by the user. Here, when the input data includes data of objects, the object information detecting unit 130 detects a plurality of object information respectively representing the objects.

Next, the relevance degree calculating unit 140 calculates a relevance degree of the user for each object (S130). For example, the relevance degree calculating unit 140 calculates a relevance degree of the user to an object so that the relevance degree of the user to the object increases as a distance between the user and the object is shorter, using the object image and the user image. Furthermore, the relevance degree calculating unit 140 calculates a relevance degree of the user to an object so that the relevance degree of the user to the object increases as the number of words representing the object that are included in the voice uttered by the user increases, using the object sound and the user voice.

Thus, there are various methods of calculating a relevance degree, such as using a distance between the user and an object and using the number of words representing the object that are included in the voice uttered by the user. When relevance degrees to one object are calculated using such methods, the relevance degree calculating unit 140 calculates, for example, an average value of the relevance degrees as a relevance degree of the user to the object. Alternatively, the relevance degree calculating unit 140 may calculate a weighted sum of the relevance degrees as a relevance degree of the user to an object.

In the case where the calculated relevance degree added to appearance information of the object is not with the storage timing (No at S140), the aforementioned processes (S110 to S130) are repeated. The timing is, for example, upon receipt of an instruction from the user or at a predetermined time.

At the time when the appearance information to which the relevance degree has been added is stored (Yes at S140), the appearance information extracting unit 151a extracts the appearance information from the object information and stores, in the lifestyle database 160, the extracted information to which the relevance degree has been added (S150). For example, the appearance information extracting unit 151a extracts a color, a texture, a pattern, a genre, and others of the object as the appearance information by performing image processing on object images. Then, the appearance information extracting unit 151a adds a relevance degree to a corresponding object, to the extracted appearance information, and stores the information in the lifestyle database 160.

As such, the lifestyle judging apparatus 100 according to Embodiment 1 in the present invention can automatically collect information for judging the lifestyle, that is, appearance information to which a relevance degree has been added, without being based on an explicit instruction from the user. Since a relevance degree of the user to an appearance of an object that implicitly represents the lifestyle of the user is used, the lifestyle of the user that does not appear in an explicit action of the user can be judged according to Embodiment 1 in the present invention.

Furthermore, the lifestyle judging apparatus 100 according to Embodiment 1 in the present invention can add a relevance degree to each of objects around the user with the same predetermined timing. In other words, since the extent that the user is associated with each of the objects is judged at a certain moment, it is possible to calculate a relevance degree to one object, which also includes the relevance to other objects. Thus, information appropriately representing the lifestyle of the user can be collected.

Furthermore, since the lifestyle judging apparatus 100 according to Embodiment 1 in the present invention determines a relevance degree according to changes in the relevance degree over time (time series information), it can appropriately determine how the user is associated with each object according to the passage of time, not limited to the judgment at a certain moment. Thus, information appropriately representing the lifestyle of the user can be collected.

Although appearance information is extracted with the timing at which the relevance degree has been added thereto, the appearance information extracting unit 151a may extract the appearance information and store it in the lifestyle database 160 when calculating the relevance degree. Here, the appearance information extracting unit 151a has only to add the relevance degree to the appearance information already stored in the lifestyle database 160 with the storage timing.

Furthermore, when the characteristics information extracting unit 151b stores the characteristics information representing the characteristics of the user in the lifestyle database 160, the characteristics information may be stored with the timing when the appearance information is stored. Alternatively, the characteristics information extracting unit 151b may extract and store the characteristics information when calculating the relevance degree.

Embodiment 2

The user interface device according to Embodiment 2 in the present invention provides a user interface according to the lifestyle determined by the lifestyle judging apparatus according to Embodiment 1. In other words, the user interface device according to Embodiment 2 in the present invention includes a user interface control unit that controls a user interface based on determined lifestyle information.

Figure 9:
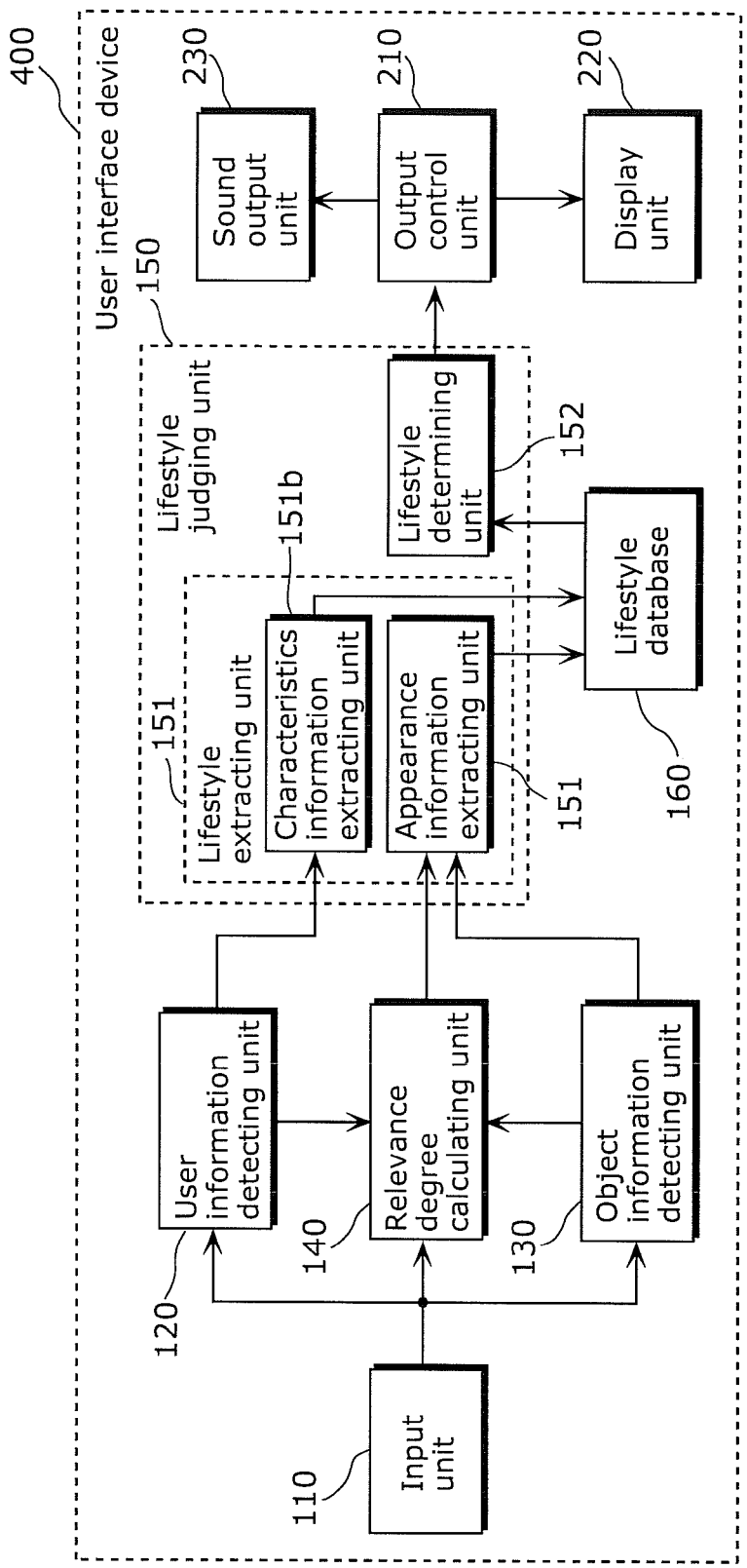
FIG. 9 is a block diagram illustrating an example of a configuration of the user interface device according to Embodiment 2 in the present invention.

FIG. 9 is a block diagram illustrating a configuration of a user interface device 400 according to Embodiment 2 in the present invention. The constituent elements of the user interface device 400 that are identical to those of the lifestyle judging apparatus 100 in FIG. 1 are numbered by the same numerals, and the description thereof will be omitted.

As illustrated in FIG. 9, the user interface device 400 includes an input unit 110, a user information detecting unit 120, an object information detecting unit 130, a relevance degree calculating unit 140, a lifestyle judging unit 150, a lifestyle database 160, an output control unit 210, a display unit 220, and a sound output unit 230.

The output control unit 210 is an example of the user interface control unit, and controls a user interface based on the lifestyle information determined by the lifestyle determining unit 152. For example, the output control unit 210 controls a display object to be displayed on the display unit 220, based on the lifestyle information. More specifically, the output control unit 210 controls a material, a layout, movement, and an effect of the display object. The specific example of the control will be described later.

Furthermore, the output control unit 210 may select a content to be displayed on the display unit 220, based on the lifestyle information. The content may be a still image, moving images, or an advertisement. Furthermore, the content may be a content stored in a recording medium, such as Hard Disk Drive (HDD) and Blu-ray Disc (BD), or may be a content obtained via the Internet or through broadcast waves.

Alternatively, the output control unit 210 may control sound contents emitted from the sound output unit 230, such as a sound effect and background music (BGM), based on the lifestyle information. In other words, the output control unit 210 may determine the sound effect or the BGM emitted from the sound output unit 230, based on the lifestyle information.

The display unit 220 is an example of the user interface, and is, for example, a thin display panel such as the video display apparatus 310 in FIG. 2A, or a projector. The display unit 220 displays various display objects, such as a content and a menu screen.

The sound output unit 230 is an example of the user interface, and is, for example, a speaker. The sound output unit 230 emits sound contents, such as a sound effect and BGM.

As described above, the user interface device 400 according to Embodiment 2 in the present invention provides a user interface according to a lifestyle of the user. The user interface device 400 according to Embodiment 2 in the present invention can automatically collect information for determining the lifestyle of the user and judge the lifestyle based on the collected information, as described in Embodiment 1.

Thus, the user interface device 400 according to Embodiment 2 in the present invention can provide a user interface according to the lifestyle of the user that is judged using the information automatically collected without being based on an explicit action of the user. Thereby, the user interface device 400 can be used, for example, as what is called an ambient display.

Figure 10:
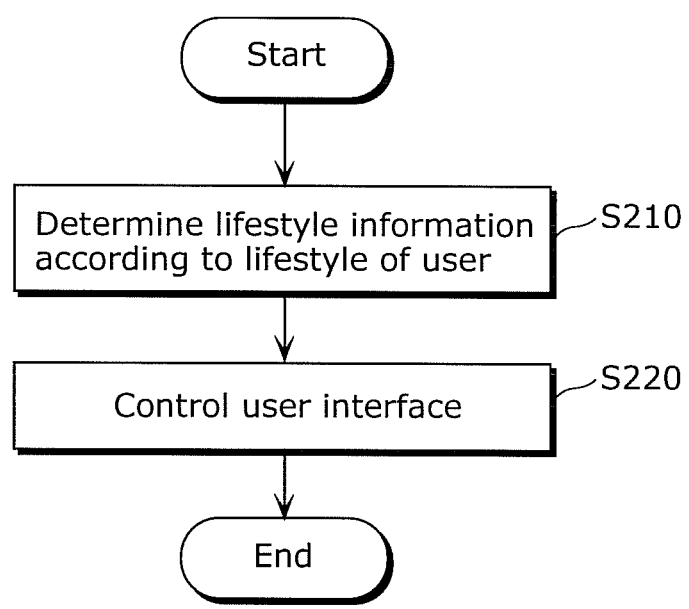
FIG. 10 is a flowchart illustrating an example of operations performed by the user interface device according to Embodiment 2 in the present invention.

FIG. 10 is a flowchart illustrating an example of operations performed by the user interface device 400 according to Embodiment 2 in the present invention. More specifically, FIG. 10 illustrates processes using information stored in the lifestyle database 160. The operations of collecting information for judging the lifestyle and storing the information in the lifestyle database 160 are identical to the operations in FIG. 8.

The lifestyle determining unit 152 determines lifestyle information representing the lifestyle of the user from information stored in the lifestyle database 160 (S210). As illustrated in FIG. 6, the user attribute, characteristics information (lifestyle variables A), and appearance information (lifestyle variables B) are stored in the lifestyle database 160 for each user. Thus, the lifestyle determining unit 152 refers to, for example, the characteristics information and the appearance information that correspond to the user and are included in the input data obtained at the time when the lifestyle information is to be determined. Then, the lifestyle determining unit 152 determines the lifestyle information representing the lifestyle of the user based on a relevance degree added to the appearance information.

More specifically, the lifestyle determining unit 152 determines the lifestyle information for each category of the appearance information. In the example of FIG. 6, the relevance degree 35 has been added to "plain", the relevance degree 20 has been added to "woodgrain", and the relevance degree 55 has been added to "dots". Here, "plain", "woodgrain", and "dots" are appearance information representing textures. Here, the lifestyle determining unit 152 determines, for example, "dots" to which the largest relevance degree has been added from a plurality of appearance information respectively representing the textures as the lifestyle information.

Furthermore, in the example of FIG. 6, the relevance degree 35 has been added to "red", the relevance degree 20 has been added to "yellow", and the relevance degree 55 has been added to "white". Here, "red", "yellow", and "white" are appearance information representing colors. The lifestyle determining unit 152 determines, for example, "white" to which the largest relevance degree has been added from a plurality of appearance information respectively representing the colors as the lifestyle information. Alternatively, the lifestyle determining unit 152 may determine the color mixture generated by weighing colors based on relevance degrees of the plurality of appearance information respectively representing the colors, as the lifestyle information. For example, the lifestyle determining unit 152 may determine the color mixture of ranked top two colors in the relevance degrees as the lifestyle information. In the example of FIG. 6, the lifestyle determining unit 152 determines pink that is a color mixture of "red" and "white", as the lifestyle information.

Furthermore, the lifestyle determining unit 152 may determine the characteristics information of the user as the lifestyle information.

Next, the output control unit 210 controls a user interface based on the lifestyle information determined by the lifestyle determining unit 152 (S220). For example, the output control unit 210 controls a display object to be displayed on the display unit 220, based on the lifestyle information. More specifically, the output control unit 210 determines at least one of a material, movement, and an effect of the display object. Alternatively, the output control unit 210 may select the sound effect or the BGM emitted from the sound output unit 230.

Hereinafter, the specific example of control on a user interface according to a lifestyle will be described. First, an example of controlling a display object to be displayed on the display unit 220 will be described. FIGS. 11A to 14D illustrate applications to user interfaces that apply results of judgment on a lifestyle, in Embodiment 2 of the present invention. Each of the drawings illustrates an example in which a display object such as a screen background is changed according to a result of the judgment on a lifestyle.

Figure 11A:
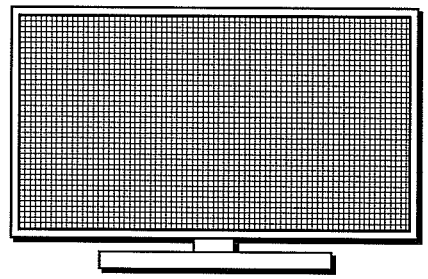
FIG. 11A illustrates an example where lifestyle information according to Embodiment 2 in the present invention is not applied to a user interface.
Figure 11B:
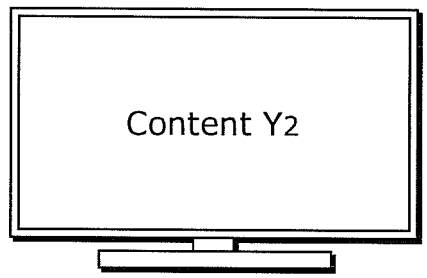
FIG. 11B illustrates an example where lifestyle information according to Embodiment 2 in the present invention is not applied to a user interface.

FIGS. 11A to 11D illustrate examples in each of which the result of the judgment on a lifestyle is not applied to the user interface. FIG. 11A illustrates an example in which a content is not displayed, and illustrates that a whole-colored image, such as black and blue images, is displayed. FIG. 11B illustrates an example in which a content is displayed, and illustrates that the content is displayed in full screen.

Figure 11C:
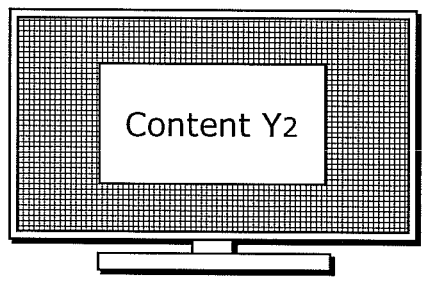
FIG. 11C illustrates an example where lifestyle information according to Embodiment 2 in the present invention is not applied to a user interface.

FIG. 11C illustrates an example in which a content is displayed, and illustrates that the content is displayed on a part of the screen. Here, a whole-colored image, such as black and blue images, is displayed on the area where the content is not displayed.

Figure 11D:
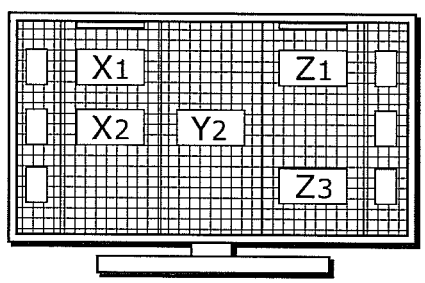
FIG. 11D illustrates an example where lifestyle information according to Embodiment 2 in the present invention is not applied to a user interface.

FIG. 11D illustrates an example in which the user selects one of contents, and illustrates that images (for example, thumbnail images) for identifying the contents are displayed. Here, a predetermined background image is displayed on the area where the thumbnail images are not displayed. The background image is, for example, a whole-colored image.

Figure 12A:
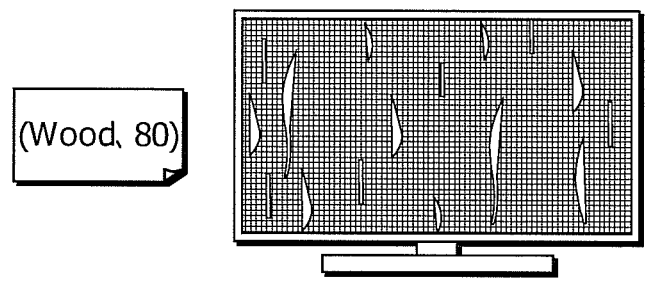
FIG. 12A illustrates an example where lifestyle information according to Embodiment 2 in the present invention is applied to a background image.
Figure 12B:
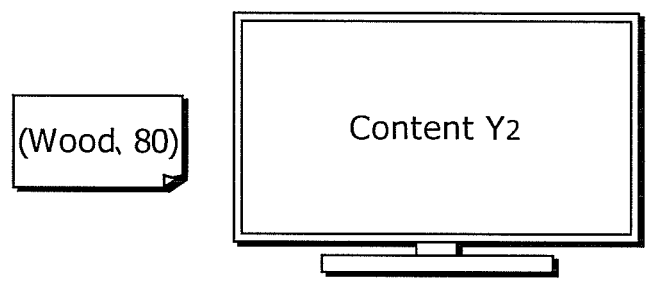
FIG. 12B illustrates an example where lifestyle information according to Embodiment 2 in the present invention is applied to a background image.
Figure 12C:
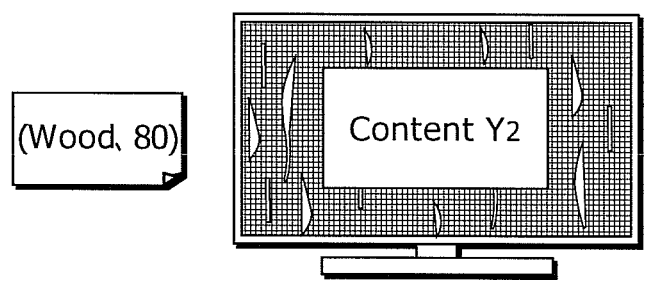
FIG. 12C illustrates an example where lifestyle information according to Embodiment 2 in the present invention is applied to a background image.
Figure 12D:
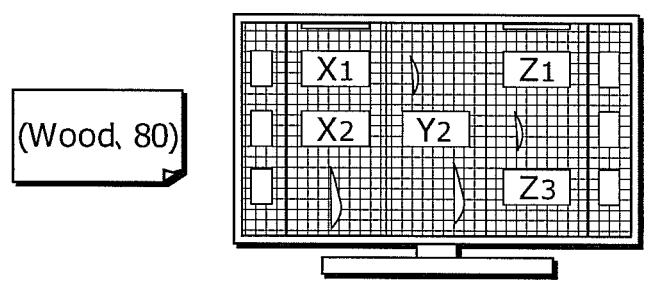
FIG. 12D illustrates an example where lifestyle information according to Embodiment 2 in the present invention is applied to a background image.

FIGS. 12A to 12D illustrate examples in each of which to woodgrain (wood) is selected as lifestyle information by the lifestyle determining unit 152. As illustrated in FIGS. 12A, 12C, and 12D, the output control unit 210 sets the woodgrain representing "wood" to the background portion of the screen, based on the lifestyle information indicating "wood".

In other words, the output control unit 210 selects the woodgrain background image, as a background image that is an example of a display object. As the woodgrain background image, an image of a woodgrain pattern held in advance by the user interface device 400 may be applied to a screen, or an image of woodgrain captured by a detection camera in the space may be appropriately processed for the application.

Figure 13A:
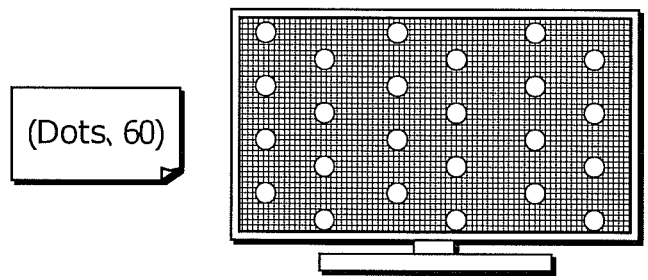
FIG. 13A illustrates an example where lifestyle information according to Embodiment 2 in the present invention is applied to a background image.
Figure 13B:
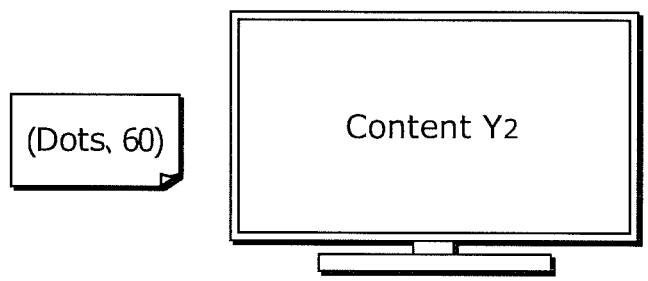
FIG. 13B illustrates an example where lifestyle information according to Embodiment 2 in the present invention is applied to a background image.
Figure 13C:
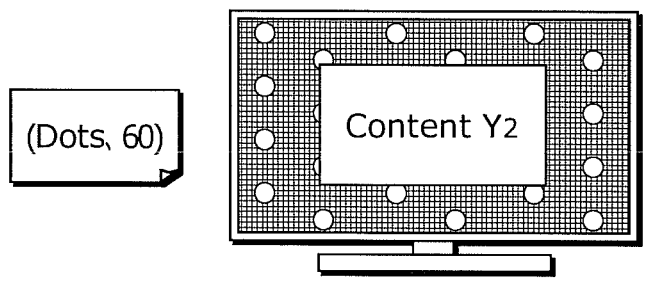
FIG. 13C illustrates an example where lifestyle information according to Embodiment 2 in the present invention is applied to a background image.
Figure 13D:
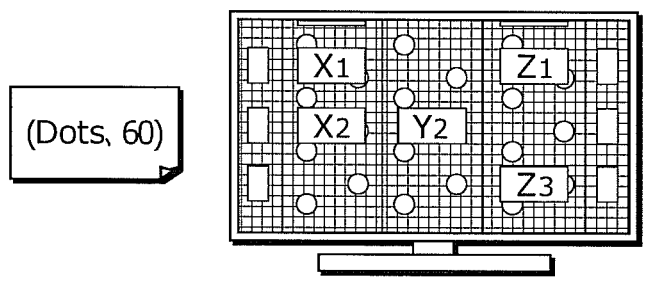
FIG. 13D illustrates an example where lifestyle information according to Embodiment 2 in the present invention is applied to a background image.

FIGS. 13A to 13D illustrate examples in each of which polka-dots (dots) are selected as lifestyle information by the lifestyle determining unit 152. As illustrated in FIGS. 13A, 13C, and 13D, the output control unit 210 arranges "polka-dots" on the background portion of the screen, based on the lifestyle information indicating "polka-dots". In other words, the output control unit 210 arranges "polka-dots" on the background image that is an example of a display object. Furthermore, the output control unit 210 may determine the color of "polka-dots" to be arranged, from the lifestyle information indicating colors. As such, a user interface may be controlled based on a plurality of lifestyle information.

Figure 14A:
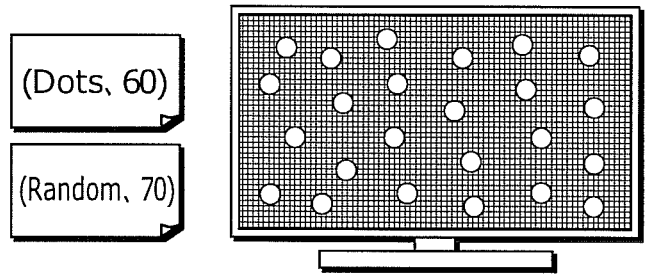
FIG. 14A illustrates an example where lifestyle information according to Embodiment 2 in the present invention is applied to a background image.
Figure 14B:
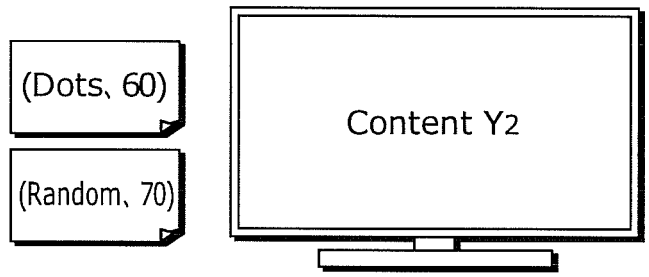
FIG. 14B illustrates an example where lifestyle information according to Embodiment 2 in the present invention is applied to a background image.
Figure 14C:
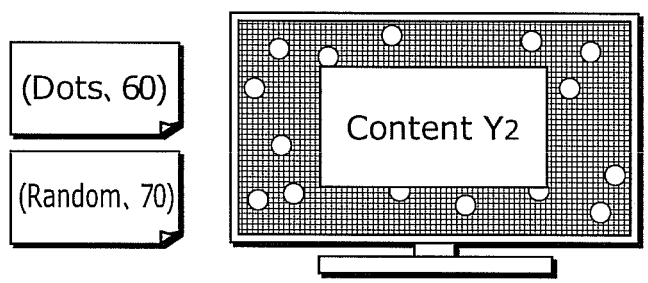
FIG. 14C illustrates an example where lifestyle information according to Embodiment 2 in the present invention is applied to a background image.
Figure 14D:
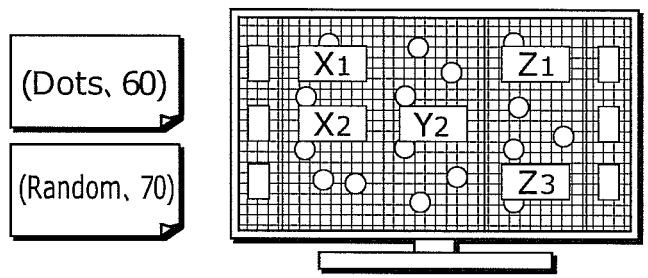
FIG. 14D illustrates an example where lifestyle information according to Embodiment 2 in the present invention is applied to a background image.

FIGS. 14A to 14D illustrate examples in each of which "polka-dots" (dots) and "random" are selected as lifestyle information by the lifestyle determining unit 152. As illustrated in FIGS. 14A, 14C, and 14D, the output control unit 210 may arrange "polka-dots" on the background portion of the screen at random, based on the lifestyle information indicating "polka-dots" and "random".

As described above, the output control unit 210 obtains information indicating a material of an object from the appearance information of the object, as the lifestyle information, and selects the material of a display object to be displayed on the display unit 220, based on the obtained lifestyle information. The information indicating the material of the object includes, for example, a color, a pattern, a texture, and others of the object.

FIGS. 15A to 17B illustrate applications to user interfaces according to results of judged lifestyle, in Embodiment 2 of the present invention. Each of the drawings illustrates an example in which the number of display objects displayed on a screen or the object movement speed is changed, according to a result of the judgment of lifestyle.

Figure 15A:
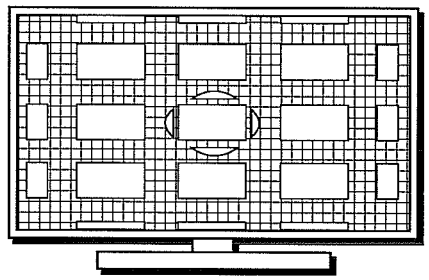
FIG. 15A illustrates an example where lifestyle information according to Embodiment 2 in the present invention is applied to a screen layout.
Figure 15B:
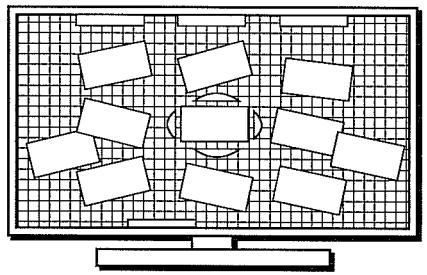
FIG. 15B illustrates an example where lifestyle information according to Embodiment 2 in the present invention is applied to a screen layout.

FIGS. 15A and 15B illustrate examples when the lifestyle determining unit 152 selects an ordered state of a room as lifestyle information. As illustrated in FIG. 15A, the output control unit 210 arranges and displays thumbnails on a screen in a matrix based on the lifestyle information indicating "ordered". Furthermore, as illustrated in FIG. 15B, the output control unit 210 displays thumbnails on a screen based on the lifestyle information indicating "scattered".

As such, when the lifestyle determining unit 152 determines information indicating the ordered state of a room, that is, information indicating the number of objects and the arrangement as the lifestyle information, the output control unit 210 controls the layout of display objects according to the arrangement of the objects. The layout of display objects includes, for example, the number of the display objects and the arrangement.

As another example, the output control unit 210 may increase the number of display objects (thumbnail images) to be displayed on a screen as the number of display objects is larger. Conversely, as the number of display objects is smaller, the output control unit 210 may decrease the number of display objects (thumbnail images) to be displayed on a screen.

Figure 16A:
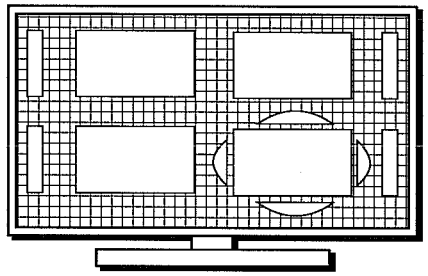
FIG. 16A illustrates an example where lifestyle information according to Embodiment 2 in the present invention is applied to the number of display objects.
Figure 16B:
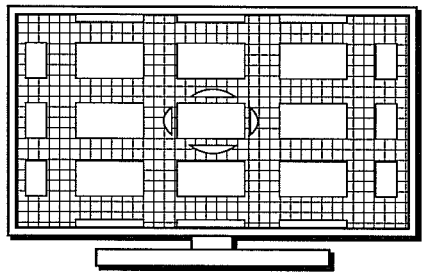
FIG. 16B illustrates an example where lifestyle information according to Embodiment 2 in the present invention is applied to the number of display objects.

FIGS. 16A and 16B illustrate examples when the lifestyle determining unit 152 selects characteristics information as lifestyle information. As illustrated in FIG. 16A, the output control unit 210 decreases the number of thumbnails on a screen based on the lifestyle information indicating "unfussy". Furthermore, as illustrated in FIG. 16B, the output control unit 210 increases the number of thumbnails on a screen based on the lifestyle information indicating "impatient".

As such, when the lifestyle determining unit 152 determines information indicating the characteristics information representing characteristics of the user, as the lifestyle information, the output control unit 210 controls the layout of display objects according to the characteristics of the user. For example, when the lifestyle determining unit 152 determines information indicating that the user acts quickly, such as "talkative", "walking fast", and "adroit" as the lifestyle information, the output control unit 210 increases the number of display objects. Conversely, for example, when the lifestyle determining unit 152 determines information indicating that the user acts slowly, such as "quiet", "walking slowly", and "awkward" as the lifestyle information, the output control unit 210 decreases the number of display objects.

Figure 17A:
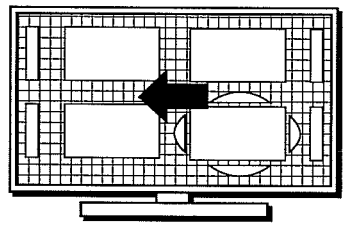
FIG. 17A illustrates an example where lifestyle information according to Embodiment 2 in the present invention is applied to the movement of a display object.
Figure 17B:
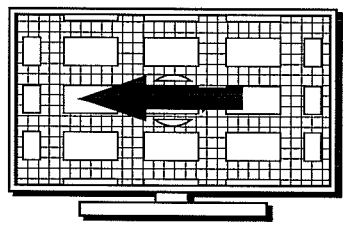
FIG. 17B illustrates an example where lifestyle information according to Embodiment 2 in the present invention is applied to the movement of a display object.

FIGS. 17A and 17B illustrate examples when the lifestyle determining unit 152 selects the characteristics information as lifestyle information. As illustrated in FIG. 17A, the output control unit 210 slows down the scrolling on a screen or the movement of each object, based on the lifestyle information indicating "unfussy". Furthermore, as illustrated in FIG. 17B, the output control unit 210 accelerates the scrolling on a screen or the movement of each object, based on the lifestyle information indicating "impatient".

As such, when the lifestyle determining unit 152 determines information indicating the characteristics information representing characteristics of the user, as the lifestyle information, the output control unit 210 controls the movement or the effect of a display object according to the characteristics of the user. For example, when the lifestyle determining unit 152 determines information indicating that the user acts quickly, such as "talkative", "walking fast", and "adroit" as the lifestyle information, the output control unit 210 accelerates the movement of a display object. Conversely, for example, when the lifestyle determining unit 152 determines information indicating that the user acts slowly, such as "quiet", "walking slowly", and "awkward" as the lifestyle information, the output control unit 210 reduces the movement of a display object.

Here, the effect of a display object is, for example, scrolling on a screen, generating an image to be displayed when a predetermined display object is selected, and switching a predetermined image to the next image. For example, when the lifestyle determining unit 152 determines information indicating that the user acts quickly as the lifestyle information, the output control unit 210 performs processes, such as increasing an amount of scrolling on a display and quickly switching between images. Furthermore, when the lifestyle determining unit 152 determines information indicating that the user acts slowly as the lifestyle information, the output control unit 210 performs processes, such as reducing an amount of scrolling on a display and slowly switching between images.

Figure 18A:
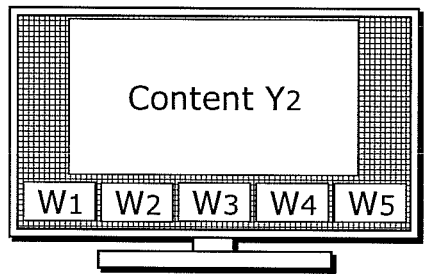
FIG. 18A illustrates an example where lifestyle information according to Embodiment 2 in the present invention is applied to recommendation of a content.
Figure 18B:
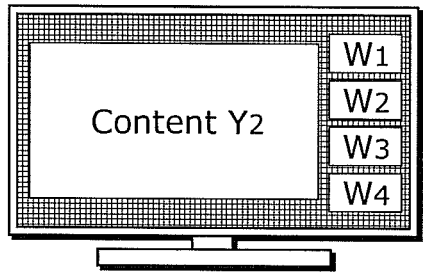
FIG. 18B illustrates an example where lifestyle information according to Embodiment 2 in the present invention is applied to recommendation of a content.

FIGS. 18A and 18B illustrate applications to user interfaces according to results of judged lifestyle, in Embodiment 2 of the present invention. More specifically, FIGS. 18A and 18B illustrate examples of selecting contents to be recommended to the user according to the results of judged lifestyle.

As illustrated in FIGS. 18A and 18B, when a recommended content is presented on a part of a screen, the output control unit 210 presents a content related to lifestyle information determined by the lifestyle determining unit 152, based on the lifestyle information. Thereby, the user can easily access the content that matches one's own lifestyle.

For example, when a product is recommended in online shopping, the output control unit 210 presents an image content illustrating the product having appearance information that matches the lifestyle information. More specifically, when the determined lifestyle information indicates "white", "linear", and "Northern European style", the output control unit 210 presents an image content illustrating a product, such as a piece of furniture, an electrical appliance, and others having such characteristics. In FIGS. 18A and 18B, a content Y2 is being viewed by the user, and contents W1 to W5 are selected by the output control unit 210 for recommending them to the user.

As described above, the user interface device 400 according to Embodiment 2 in the present invention determines lifestyle information as in Embodiment 1, and controls a user interface which is provided to the user, based on the determined lifestyle information.

With the configuration, a lifestyle can be automatically judged without any trouble, and a result of the judgment can be reflected on the user interface. Thereby, the user interface that matches the lifestyle of each user can be provided.

The lifestyle information may be reflected on a sound effect or BGM, albeit no description of applications of judged results of a lifestyle to a user interface. For example, when the lifestyle determining unit 152 determines characteristics information indicating the characteristics of the user as the lifestyle information, the output control unit 210 controls the sound effect or BGM according to the characteristics of the user.

For example, when the lifestyle determining unit 152 determines information indicating that the user acts quickly, such as "talkative", "walking fast", and "adroit" as the lifestyle information, the output control unit 210 selects fast-paced music as the BGM. Conversely, for example, when the lifestyle determining unit 152 determines information indicating that the user acts slowly, such as "quiet", "walking slowly", and "awkward" as the lifestyle information, the output control unit 210 selects slow-paced music as the BGM.

Alternatively, when the lifestyle determining unit 152 determines appearance information representing an atmosphere of an object as the lifestyle information, the output control unit 210 controls the sound effect or BGM emitted from the sound output unit 230 according to the atmosphere of the object. For example, when the lifestyle information indicates "Japanese style", the output control unit 210 selects music arranged in Japanese style as the BGM. Here, the music is Japanese music, such as Japanese folk music and popular ballad. Alternatively, when the lifestyle information indicates "Western style", the output control unit 210 selects Western music as the BGM.

<Supplemental Remarks>

Although the lifestyle judging apparatus, the user interface device, and the lifestyle judging method according to the present invention are described based on Embodiments, the present invention is not limited to these Embodiments. All modifications and other embodiments conceivable by those skilled in the art through arbitrarily combining the structural elements of different embodiments are intended to be included within the scope of the present invention.

Although Embodiments describe the lifestyle judging apparatus that collects information for judging a lifestyle of a user and determines the lifestyle of the user, the present invention can be implemented as a lifestyle collecting apparatus that collects information for judging the lifestyle of the user.

Figure 19:
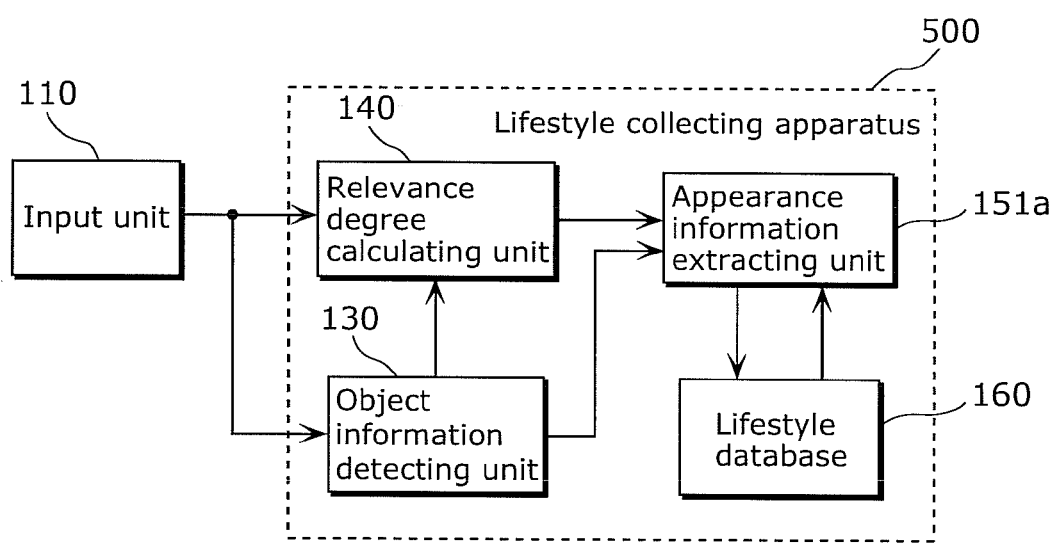
FIG. 19 is a block diagram illustrating a configuration of a lifestyle collecting apparatus according to a modification of Embodiments in the present invention.

FIG. 19 is a block diagram illustrating an example of a configuration of a lifestyle collecting apparatus 500 according to a modification of Embodiments in the present invention. As illustrated in FIG. 19, the lifestyle collecting apparatus 500 includes the object information detecting unit 130, the relevance degree calculating unit 140, the appearance information extracting unit 151a, and the lifestyle database 160. The constituent elements of the lifestyle collecting apparatus 500 that are identical to those according to Embodiment 1 are numbered by the same numerals, and the description thereof will be omitted.

With the configuration, the lifestyle collecting apparatus 500 can automatically collect information for judging the lifestyle of the user, without being based on an explicit action of the user. Accordingly, it is possible to support determining the lifestyle of the user, using the collected information, and providing a user interface based on the determined lifestyle.

Furthermore, Embodiment 2 describes the example of referring to the characteristics information and the appearance information that correspond to the user and are included in input data obtained at the time when the lifestyle information is to be determined. Here, when the input data includes data of users, the following procedure may be taken.

More specifically, the lifestyle determining unit 152 refers to the characteristics information and the appearance information corresponding to each of the users. Then, the lifestyle determining unit 152 determines appearance information having the highest relevance degree as the lifestyle information, from the characteristics information and the appearance information corresponding to each of the users.

Alternatively, the lifestyle determining unit 152 may obtain the appearance information to which the highest relevance degree has been added, for each of the users, and determine the lifestyle information by combining a plurality of the appearance information. For example, the lifestyle determining unit 152 generates new information so as to include the plurality of the appearance information, and determines the generated information as the lifestyle information. For example, when the user 001 has the highest relevance degree to "red" and the user 002 has the highest relevance degree to "blue", the lifestyle determining unit 152 determines "purple" by combining "red" and "blue" as the lifestyle information.

Furthermore, the lifestyle determining unit 152 may determine the lifestyle information by combining a plurality of characteristics information of the users. Alternatively, the input unit 110 and the user information detecting unit 120 may detect a user who operates the display unit 220 from among users, and the lifestyle determining unit 152 may determine characteristics information of the detected user as the lifestyle information.

Furthermore, the numbers used in the description are exemplified all for specifically describing the present invention, and the present invention is not limited to the exemplified numbers. The relation of connection for implementing the functions of the present invention is not limited to the one herein.

Furthermore, although Embodiments are implemented using hardware and/or software, the configuration using the hardware may be configured using the software, and alternatively, the configuration using the software may be configured using the hardware.

Furthermore, the configurations of the lifestyle judging apparatus 100 and the user interface device 400 are exemplified for specifically describing the present invention. Thus, each of the lifestyle judging apparatus 100 and the user interface device 400 does not necessarily have to include all the constituent elements. In other words, each of the lifestyle judging apparatus and the user interface device according to the present invention has only to include the minimum configuration that can achieve the effects of the present invention.

For example, each of the lifestyle judging apparatus 100 and the user interface device 400 does not have to include the input unit 110. In other words, the user information detecting unit 120 and the object information detecting unit 130 may use input data obtained by, for example, an external capturing apparatus and a sound pickup device.

Furthermore, the user interface device 400 does not have to include the display unit 220 and the sound output unit 230. In other words, the output control unit 210 may control an external display device and an external sound output device.

Furthermore, each of the lifestyle judging apparatus 100, the user interface device 400, and the lifestyle collecting apparatus 500 may be implemented as an integrated circuit. Here, for example, the lifestyle collecting apparatus 500 does not have to include the lifestyle database 160, and may store appearance information in a separate memory.

Furthermore, the user attributes in FIG. 6 may be detected by the user information detecting unit 120, or registered by the user in advance. The user attributes can be easily updated by registering only the age at the time of registering together with his/her birth day, where there is no change in the gender. Here, the user has only to register attributes once, and the user information detecting unit 120 does not have to detect the user information. Thus, the processing amount can be reduced.

Similarly, since the method of collecting the lifestyle performed by the lifestyle judging apparatus is exemplified for specifically describing the present invention, the method of collecting the lifestyle performed by the lifestyle judging apparatus according to the present invention does not necessarily have to include all the steps. In other words, the method of collecting the lifestyle according to the present invention has only to include the minimum steps that can achieve the effects of the present invention. Furthermore, since the procedure in which the steps are to be executed is exemplified for specifically describing the present invention, other procedures may be used. Furthermore, parts of the steps may be executed in parallel (concurrently) with other steps.

(1) Each of the above apparatuses is specifically a computer system including a micro processing unit, a ROM, a RAM, a hard disk unit, a display unit, a keyboard, and a mouse. A computer program is stored in the RAM or the hard disk unit. The micro processing unit operates according to the computer program, so that each of the apparatuses fulfills the function. Here, in order to fulfill a predetermined function, the computer program is programmed by combining instruction codes each indicating an instruction for a computer. Here, each of the above apparatuses is not limited to a computer system including all of a micro processing unit, a ROM, a RAM, a hard disk unit, a display unit, a keyboard, and a mouse, but may be a computer system including parts of these.

(2) Parts or all of the constituent elements included in each of the above apparatuses may be included in one system large scale integration (LSI). The system LSI is a super-multifunctional LSI manufactured by integrating the constituent elements on one chip and is, specifically, a computer system including a micro processing unit, a ROM, and a RAM. The computer program is stored in the RAM. The micro processing unit operates according to the computer program, so that each of the apparatuses fulfills the function.

The name used here is system LSI, but it may also be called IC, LSI, super LSI, or ultra LSI depending on the degree of integration. Moreover, ways to achieve integration are not limited to the LSI, and special circuit or general-purpose processor and so forth can also achieve the integration. Field Programmable Gate Array (FPGA) that can be programmed after manufacturing LSI or a reconfigurable processor that allows re-configuration of the connection or configuration of circuit cells within the LSI can be used for the same purpose.

Furthermore, if integrated circuit technology that replaces LSI appears thorough progress in semiconductor technology or other derived technology, that technology can naturally be used to carry out integration of the functional blocks. Application of biotechnology is one such possibility.

(3) Parts or all of the constituent elements included in each of the above apparatuses may be included in an IC card removable from each of the apparatuses or in a stand alone module. The IC card or the module is a computer system including a micro processing unit, a ROM, and a RAM. The IC card or the module may include the above super-multi-functional LSI. The micro processing unit operates according to the computer program, so that the IC card or the module fulfills the function. The IC card or the module may have tamper-resistance.

(4) The present invention may be any of the above methods. Furthermore, the present invention may be a computer program which causes a computer to execute these methods, and a digital signal included in the computer program.

Moreover, in the present invention, the computer program or the digital signal may be recorded on a computer-readable recording medium such as a flexible disk, a hard disk, a CD-ROM, an MO, a DVD, a DVD-ROM, a DVD-RAM, a Blu-ray Disc (BD), and a semiconductor memory. Moreover, the present invention may be the computer program or the digital signal recorded on these recording media.

Furthermore, in the present invention, the computer program or the digital signal may be transmitted via an electronic communication line, a wireless or wired communication line, a network represented by the Internet, data broadcasting, and the like.

Moreover, the present invention may be a computer system including a micro processing unit and a memory. The memory may store the above computer program, and the micro processing unit may operate according to the computer program.

Furthermore, the present invention may execute the computer program or the digital signal in another independent computer system by recording the computer program or the digital signal on the recording medium and transporting the recording medium, or by transmitting the computer program or the digital signal via a network and the like.

(5) Embodiments and the modification may be combined.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The lifestyle collecting apparatus and the user interface device according to the present invention are applicable to apparatuses for automatically judging the lifestyle of the user, such as a display control apparatus, a display apparatus, and an ambient display.

What is claimed is:

1. A user interface device that provides a user interface according to a lifestyle of a user, said user interface device comprising:
   an object information detecting unit configured to detect object information representing an object around the user;
   a relevance degree calculating unit including a processor configured to calculate a relevance degree of the user to the object, using the object information;
   an appearance information extracting unit configured to extract appearance information from the object information, and add the relevance degree to the extracted appearance information, the appearance information representing an appearance of the object;
   a lifestyle database which stores the appearance information to which the relevance degree has been added;
   a lifestyle determining unit configured to determine lifestyle information representing the lifestyle of the user, from the appearance information stored in the lifestyle database, based on the relevance degree; and
   a user interface control unit configured to control the user interface based on the lifestyle information determined by said lifestyle determining unit,
   wherein said object information detecting unit is configured to extract the object information representing, as the object, at least one of a piece of furniture, an electrical appliance, play equipment, housing-related material, and a pet animal that are present around the user,
   wherein said appearance information extracting unit is configured to extract, as the appearance information, information indicating at least one of a color, a texture, a pattern, a shape, and a genre of the object,
   wherein said lifestyle determining unit is configured to determine information indicating a material of the object, as the appearance information representing the lifestyle of the user,
   wherein said user interface control unit is configured to select a material of a display object to be displayed on a display unit, based on the appearance information determined by said lifestyle determining unit, and
   wherein the information indicating the material of the object includes at least one of the color, the pattern, and the texture of the object.

2. A user interface device that provides a user interface according to a lifestyle of a user, said user interface device comprising:
   an object information detecting unit configured to detect object information representing an object around the user;
   a relevance degree calculating unit including a processor configured to calculate a relevance degree of the user to the object, using the object information;
   an appearance information extracting unit configured to extract appearance information from the object information, and add the relevance degree to the extracted appearance information, the appearance information representing an appearance of the object;
   a lifestyle database which stores the appearance information to which the relevance degree has been added;
   a lifestyle determining unit configured to determine lifestyle information representing the lifestyle of the user, from the appearance information stored in the lifestyle database, based on the relevance degree; and
   a user interface control unit configured to control the user interface based on the lifestyle information determined by said lifestyle determining unit, wherein said object information detecting unit is configured to extract the object information representing, as the object, at least one of a piece of furniture, an electrical appliance, play equipment, housing-related material, and a pet animal that are present around the user, wherein said appearance information extracting unit is configured to extract, as the appearance information, information indicating at least one of a color, a texture, a pattern, a shape, and a genre of the object, wherein said lifestyle determining unit is configured to determine information representing an atmosphere of the object, as the appearance information representing the lifestyle of the user, wherein said user interface control unit is configured to control a sound effect or a BGM to be emitted from a sound output unit, according to the atmosphere of the object, and wherein the atmosphere is at least one of Japanese style, Northern European style, Western style, Asian style, ethnic style, and modern style.

3. A lifestyle collecting apparatus that collects information for determining a lifestyle of a user, said apparatus comprising:

an object information detecting unit configured to detect object information representing an object around the user;

a relevance degree calculating unit configured to calculate a relevance degree of the user to the object, using the object information;

an appearance information extracting unit configured to extract appearance information from the object information, and add the relevance degree to the extracted appearance information, the appearance information representing an appearance of the object;

a lifestyle database which stores the appearance information to which the relevance degree has been added, as the information for determining the lifestyle of the user; and a user information detecting unit configured to detect user information representing the user, wherein said relevance degree calculating unit is configured to calculate the relevance degree of the user to the object represented by the object information, using the user information and the object information, the user being represented by the user information, wherein the user information is image data representing the user, wherein the object information is image data representing the object, and wherein said relevance degree calculating unit is configured to calculate the relevance degree of the user to the object so that the relevance degree increases as a number of occurrences that the user touches the object is larger or a period for which the user touches the object is longer.

4. A lifestyle collecting apparatus that collects information for determining a lifestyle of a user, said apparatus comprising:

an object information detecting unit configured to detect object information representing an object around the user;

a relevance degree calculating unit configured to calculate a relevance degree of the user to the object, using the object information;

an appearance information extracting unit configured to extract appearance information from the object information, and add the relevance degree to the extracted appearance information, the appearance information representing an appearance of the object;

a lifestyle database which stores the appearance information to which the relevance degree has been added, as the information for determining the lifestyle of the user; and a user information detecting unit configured to detect user information representing the user, wherein said relevance degree calculating unit is configured to calculate the relevance degree of the user to the object represented by the object information, using the user information and the object information, the user being represented by the user information, wherein the user information is sound data representing a voice uttered by the user, wherein the object information is sound data indicating words representing the object, and wherein said relevance degree calculating unit is configured to calculate the relevance degree of the user to the object so that the relevance degree increases as a number of occurrences that the user utters the words representing the object is larger.

* * * * *